United States Patent
Li et al.

(10) Patent No.: US 11,630,730 B1
(45) Date of Patent: Apr. 18, 2023

(54) DATA PROCESSING PIPELINE ERROR RECOVERY

(71) Applicant: Zoox, Inc., Foster City, CA (US)

(72) Inventors: Hao Li, San Jose, CA (US); Prakul Agarwal, San Francisco, CA (US); Conrad Herrmann, San Francisco, CA (US); Christian Yang, Sunnyvale, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 17/515,157

(22) Filed: Oct. 29, 2021

(51) Int. Cl.
*G06F 11/00* (2006.01)
*G06F 11/14* (2006.01)
*G06F 9/48* (2006.01)
*G06F 11/07* (2006.01)

(52) U.S. Cl.
CPC ........ *G06F 11/1405* (2013.01); *G06F 9/4881* (2013.01); *G06F 11/0772* (2013.01); *G06F 11/0793* (2013.01); *G06F 11/14* (2013.01)

(58) Field of Classification Search
CPC .. G06F 11/0772; G06F 11/0793; G06F 11/14; G06F 11/1405
See application file for complete search history.

(56) References Cited

U.S. PATENT DOCUMENTS

| | | | | |
|---|---|---|---|---|
| 7,673,190 B1* | 3/2010 | Engelbrecht | ........ | G06F 12/0802 714/49 |
| 11,356,508 B1* | 6/2022 | Vergara | .................... | H04L 67/06 |
| 2005/0022094 A1* | 1/2005 | Mudge | .................. | G06F 11/167 714/E11.056 |
| 2007/0214381 A1* | 9/2007 | Goyal | ................. | G06F 11/1482 714/5.1 |
| 2010/0058107 A1* | 3/2010 | Blaauw | .................. | G06F 11/167 714/48 |
| 2011/0107166 A1* | 5/2011 | Flautner | .............. | G06F 11/1402 714/E11.023 |
| 2013/0151819 A1* | 6/2013 | Piry | .......................... | G06F 9/38 712/E9.023 |
| 2018/0129573 A1* | 5/2018 | Iturbe | ................. | G06F 11/1608 |
| 2019/0065241 A1* | 2/2019 | Wong | .................. | G06F 11/0751 |

* cited by examiner

*Primary Examiner* — Joshua P Lottich
(74) *Attorney, Agent, or Firm* — Lee & Hayes, P.C.

(57) ABSTRACT

Techniques are disclosed for executing a data processing pipeline. The techniques may include receiving a job at a data pipeline queue, setting up one or more distributed processing environments, and allocating the job to one of the distributed processing environments. The techniques may further include receiving the allocated job at a job queue within the distributed processing environment, increasing a priority level of the job, and executing the job within the distributed processing environment. The techniques can further include providing a retry pipeline at the data processing pipeline, and re-executing the job at a stage following a failure of at least one of its components. The techniques may decrement the retry budget as the job is re-executed.

20 Claims, 9 Drawing Sheets

DATA PROCESSING PIPELINE ERROR RECOVERY

BACKGROUND

Data processing pipelines are used in order to process the data in the form of jobs. For example, a data processing pipeline may be used to process remote sensor data, determine the operations of one or more components of a remote system, and the like. These data processing pipelines may be composed of hundreds, or even thousands, of components.

At times, a component of a data processing pipeline may fail for one reason or another—the component may not have received an input it needed to properly execute, the component may have erroneously executed (e.g., due to a hardware failure, due to a software "bug"), the component may have been paused, physical failures (such as power failures) may cause systems to shut down, and the like. Because of the complexity of the pipeline, the failure may go unnoticed and/or it may be difficult to identify which component failed.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
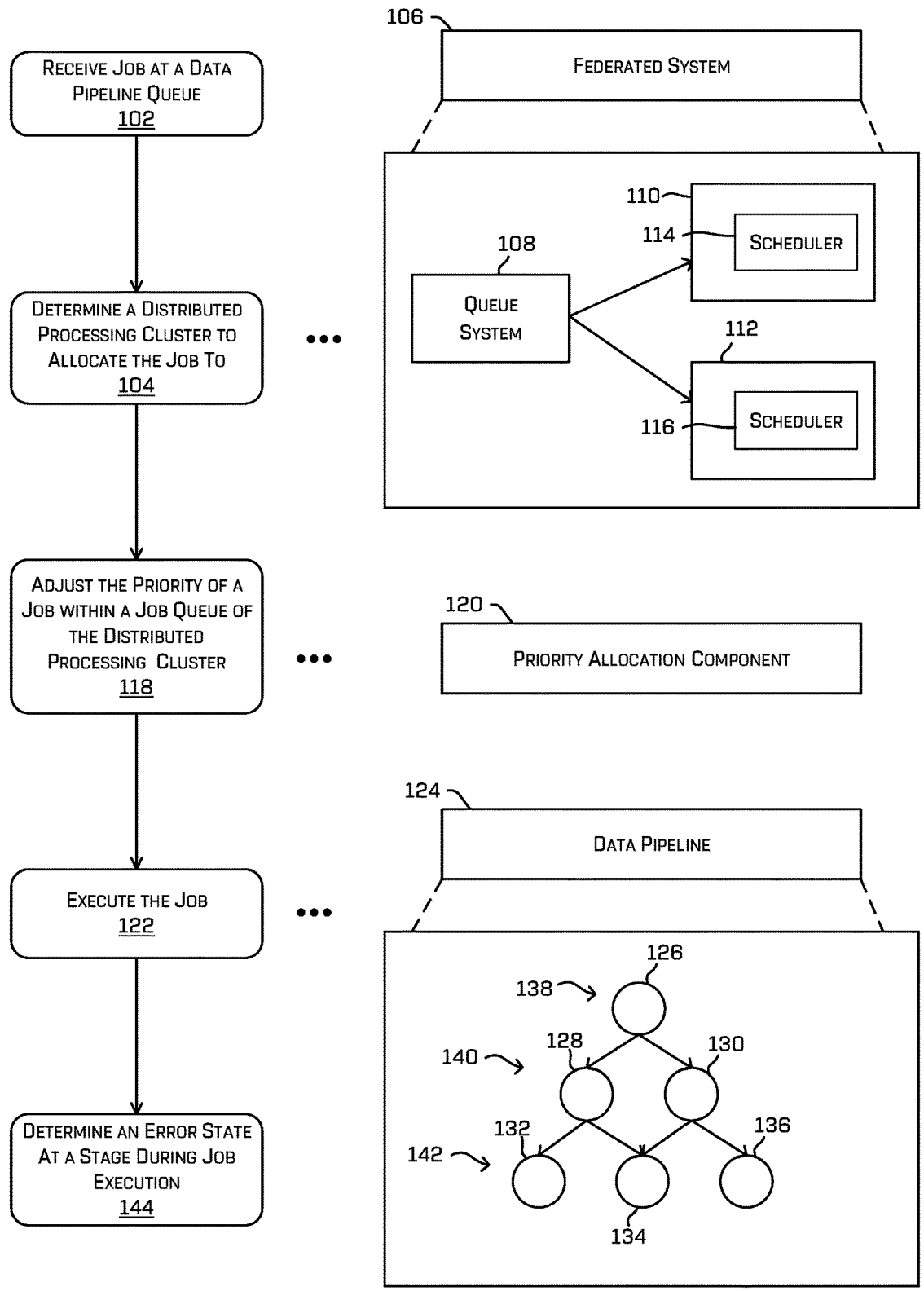
FIG. 1 is a pictorial flow diagram of an example process of executing a job on a data processing pipeline.

Techniques for executing a job on a data processing pipeline as discussed herein. The job may include processing data, such as sensor data from a vehicle as it traverses an environment. In some examples, the job includes various components such as one or more execution constraints. In some examples, the execution constraint may be, but not limited to, requiring (or preferring) a local component, a cloud component, a central processing component, a graphics processing component, and the like. In some examples, the job can be received at and processed by a controller such as a scheduling component. The controller can place the job into a data pipeline queue. The controller can allocate the data to a job queue within a distributed processing cluster. Additionally or alternatively, the controller can determine, based on the execution constraint, whether the distributed processing cluster contains sufficient resources to execute the job and/or whether a scheduler component of the distributed processing cluster is overloaded. In examples where the distributed processing cluster lacks sufficient resources to execute the job or if the schedule is overloaded, the controller can horizontally scale and set up a new distributed processing cluster to allocate the job to. Within the distributed processing cluster, a separate controller can modify a priority level of the job based on a component of the job. In some examples, the component may be, but not limited to, the execution constraint, the submission time and/or date of the job, the name of the job, and the like. Within the distributed processing cluster, the job can be executed based on a compute graph and along one or more stages. In some examples, the job may be associated with one or more retry budgets. In some examples, the job may output an error code when executed at a stage. In some examples, upon outputting the error code, the job may be re-executed at the stage while decrementing from the retry budget.

In some examples, when a vehicle traverses an environment, the vehicle may generate data from its various systems. At least some of the data generated by the various systems of the vehicle may be stored as vehicle data. In some examples, the vehicle data may include sensor data, passenger data, map data, route data, calibration data, perception data, teleoperation data, traffic data, and the like. In some examples, the vehicle may be an autonomous vehicle.

In some examples, the data may be processed within a data processing pipeline in the form of a job. Examples of jobs may be, but are not limited to, generating bounding boxes, generating semantic labels, object detection, configuring a vehicle controller, ingesting vehicle (e.g., sensor) data, training machine learning models, updating and/or compiling code, backing up data, and the like. The data processing pipeline may run any number of jobs comprising one or more components. In some examples, a component may comprise a computational environment in which the component runs (e.g., an operating system for which the component is configured, a process that owns the component), execution constraints (e.g., preferred hardware for execution, such as a central processing component (CPU), a graphics processing component (GPU), an application-specific integrated circuit (ASIC)), a retry budget (e.g., a number of times to re-execute the component after failure of the component before taking a different action other than attempting re-execution), instructions following failure (e.g., whether to re-execute, what to do when the retry budget is exhausted, instructions to output a default or primary (pre-defined) output instead of an output determined by the component), and the like.

In some examples, the data processing pipeline includes pipeline scheduling component. In some examples, the pipeline scheduling component may be a controller. In some examples, the pipeline scheduling component may manage a pipeline queue. In some examples, the pipeline queue can receive and store one or more jobs. In some examples, each job may include one or more characteristics such as execution constraints, a submission time and/or date, a name, a completion time, a priority level, and the like. In some examples, the data processing pipeline may include a pipeline allocator component which can allocate jobs to one or more distributed processing clusters.

In some examples, a pipeline allocation component may allocate jobs from the pipeline queue to one of a plurality of distributed processing clusters (e.g., a first distributed processing cluster, a second distributed processing cluster, a third distributed processing cluster, and the like) based on whether a distributed processing cluster has been overloaded. Examples of cluster overload may include, but are not limited to, number of jobs executing and/or at a job queue at the cluster, job runtime, job parallelism, organizational attribution (e.g., the distributed processing cluster only processes jobs associated with a particular component of the vehicle), response time, turn-around time, wait time, and the like. In some examples, the pipeline allocation component may be a separate controller from the pipeline scheduling component. In some examples, the pipeline allocation component maybe within the same controller as the pipeline scheduling component. Additionally or alternatively, in some examples, the pipeline allocation component can determine, based on an execution constraint, whether a distributed processing cluster has enough free resources to execute the job.

In some examples, when there is no distributed processing cluster available to allocate a job to, the allocation component can coordinate with a pipeline scaling component to set up an additional distributed processing cluster to allocate the job to. In some examples, the pipeline scaling component may be incorporated into the pipeline allocation component. In some examples, the pipeline scaling component may be a separate controller from the pipeline allocation component.

In some examples, once the job is allocated to a distributed processing cluster, a cluster scheduling component can place the job into a job queue within the distributed processing cluster. In some examples, a priority allocation component within the distributed processing cluster can determine an available resource, such as a central processing component, a graphics processing component, a cloud component, a local component, and the like, traverse the job queue, and increase the priority of jobs with the same execution constraint as the available resource. In some examples, the priority allocation component may be a controller. In some examples, the priority allocation component can determine that a currently executing job is using the same type of resource as the available resource and scale the job to utilize the available resource.

In some examples, the techniques described herein may comprise executing a job comprising multiple components based on a compute graph. In some examples, a component may comprise multiple elements (e.g., various combinations of hardware and/or software). In some examples, the component may be a task (e.g., a process, a function, a thread, some unit of execution) executable by one or more processors. In some examples, the compute graph may comprise one or more stages. The techniques may cause the job to execute, which may cause the components of the job to execute. In some examples, causing the job to execute may comprise causing one or more components of the job to execution based at least in part on the compute graph. In some examples, the one or more components of the job may execute serially, in parallel, substantially simultaneously (within technical tolerances), synchronously, and/or asynchronously at the one or more stages.

In some examples, a component of a job executing at a stage may encounter an error, resulting in the component to output an error code. In some examples, the error code may be indicative of a predefined error, an undefined error, and the like. In some examples, upon outputting the error code, the component of the job may be automatically re-executed at the stage, and a retry budget associated with the job may be decremented. In some examples, there may be different retry budgets associated with different types of errors.

The techniques described herein may improve the performance of computing environment by reducing the processing time for each job and executing more jobs together. In the context of horizontal scaling, setting up additional distributed processing clusters can allow more jobs to be executed at the same time while limiting the need for user input. In the context of adjusting the priority of a job within a job queue, adjusting the priority can maximize cluster usage. In the context of error recovery, automating re-executing a job using a retry budget can ensure that a job can be executed to completion with minimum user interaction and minimizing per job resource usage.

The methods, apparatuses, and systems described herein may be implemented in a number of ways. Example implementations are provided below with reference to the following figures. Although discussed in the context of an autonomous vehicle, in some examples, the methods, apparatuses, and systems described herein may be applied to a variety of systems. In another example, the methods, apparatuses, and systems may be utilized to process any type of data or jobs associated with a variety of contexts, such as manufacturing processes, financial data, commercial data, and the like.

FIG. 1 illustrates an example process 100 of executing a job on a data processing pipeline.

At operation 102, a data processing pipeline can receive a job at a pipeline queue. In some examples, a pipeline scheduling component may place the job within the queue. In some examples, the job may comprise one or more characteristics. In some examples, a characteristic may comprise a name, a submission time and/or date, a computational environment in which the component runs (e.g., an operating system for which the component is configured, a process that owns the component), execution constraints (e.g., preferred hardware for execution, such as CPU, GPU, ASIC, preferred execution resource, such as local resource or cloud resource), a retry budget (e.g., a number of times to re-execute the component after failure of the component before taking a different action other than attempting re-execution), instructions following failure (e.g., whether to re-execute, what to do when the retry budget is exhausted, instructions to output a default or primary (pre-defined) output instead of an output determined by the component), a default or primary (pre-defined) priority level, and the like.

At operation 104, a pipeline allocation component can determine a distributed processing cluster to allocate the job. In some examples, the distributed processing cluster may include a plurality of local and/or cloud computing components. In some examples, a pipeline allocation component can select a job at the top of the data pipeline queue for allocation. In some examples, the pipeline allocation component can determine whether a cluster scheduling component at the distributed processing cluster is overloaded based on a scheduling overload threshold. Examples of the scheduling overload threshold may include, but are not limited to, a number of jobs executing at the cluster, the number of jobs within a job queue at the cluster, total job runtime at the cluster, organizational attribution associated with the cluster (e.g., the distributed processing cluster configured to processes jobs associated with a particular component of the vehicle), response time, turnaround time, wait time at the job queue, and the like. In some examples, the number or jobs executing at the cluster can depend on whether the cluster supports parallel processing of jobs. Multiple jobs may be prioritized, selected, identified, or otherwise determined by the pipeline allocation component when, for example, the cluster supports parallel processing of the jobs. In some examples, when the pipeline allocation component determines that cluster scheduling component is overloaded, the pipeline allocation component can determine whether a scheduling component at a second distributed processing cluster is overloaded and allocate the job to the second distributed processing cluster when the scheduling component at the second distributed processing cluster is not overloaded. In some examples, the pipeline allocation component may be a separate controller from the pipeline scheduling component. In some examples, the job allocated to the distributed processing cluster is placed within a job queue of the distributed processing cluster.

Additionally or alternatively, in some examples, the pipeline allocation component may prioritize jobs in the queue based on submission dates, names, default or primary priority levels, and the like. In some examples, the pipeline allocation component may determine whether a default or primary distributed processing cluster has the resources necessary based on the one or more execution constraints of the job. In examples where the pipeline allocation component determines that the default or primary distributed processing cluster does not have the necessary resources and/or a scheduling component at the default or primary distributed processing cluster is overloaded, the data pipeline scheduling component may cooperate with a pipeline scaling component to set up a second distributed processing cluster to allocate the job to.

Example 106 illustrate an example federated system. Queue component 108 may include the pipeline scheduling component, the pipeline queue, the pipeline allocation component, and the pipeline scaling component. First cluster 110 may be a first distributed processing cluster. The first cluster can include a first cluster scheduling component 114. Second cluster 112 may be an example additional distributed processing cluster that is set up by the pipeline allocation component and the pipeline scaling component. Second cluster 112 may include a second cluster scheduling component 116. The arrows represent that the job may be allocated to either first cluster 110 or second cluster 112. In some examples, the first cluster 110 and the second cluster 112 are configured to operate independently of one another. In some examples, such independence may include the first cluster 110 and second cluster 112 are not aware of each other, and only the pipeline allocation component is aware of both clusters. Additional details associated with operation 104 are discussed in connection with FIGS. 2-4, as well as throughout this disclosure.

At operation 118, a priority allocation component within a distributed processing cluster can adjust a priority of a job within a job queue of the distributed processing cluster. In some examples, the priority allocation component may be a controller. In some examples, the priority allocation component may be a part of a cluster scheduling component. In some examples, the priority allocation component may be separate from the cluster scheduling component. In some examples, the priority allocation component can adjust the priority of the job based on a processing strategy. In some examples, the processing strategy may involve adjusting the priority of the job based on one or more execution constraints of the job and available resources within the distributed processing cluster. In some examples, the processing strategy may include associating the job with hardware component such as a central processing component, a parallel processing component such as a graphics processing component, a local processing component, a cloud processing component, a non-virtualized processing component, and the like. In some examples, the parallel processing component may be associated with particular compute components within the distributed processing cluster. In some examples, a compute component may be limited to executing two jobs associated with video encoding. In some examples, when a compute component can only execute two jobs associated with video encoding, such a restriction may create a bottleneck for other jobs associated with the parallel processing component because a compute component can generally execute more than two jobs associated with the parallel processing component.

In some examples, the local processing component may include one or more computing components that are onsite and/or under permanent control and/or ownership by a user, such as being idle when unused. An example use of local processing component may include processing jobs at a resting autonomous vehicle. In some examples, a cloud processing component may include one or more computing components that are offsite and/or computing components where the user rents resources and/or access by time and/or retains access for a limited time. In some examples, the processing strategy may include the name of the job and/or the submission date and/or time of the job. In some examples, the priority allocation component can adjust the priority of a job by moving the job to the top of the job queue. In some examples, the priority allocation component can adjust the priority of a job by increasing or decreasing the priority level of the job. In some examples, the priority allocation component can re-evaluate the resources allocated to the job or a currently executing job and can narrow or widen the job or the currently executing job. In some examples, Example 120 illustrates a priority allocation component as an example controller configured to adjust the priority of the job. Additional details associated with operation 118 are discussed in connection with FIG. 5, as well as throughout this disclosure.

At operation 122, the job is executed at the distributed processing cluster based on a compute graph. In some examples, the compute graph can include resource nodes. Example 124 illustrates an example data processing pipeline. Example 124 includes a compute graph including first level 138, second level 140, and third level 142. First level 138 includes first stage 126. Second level 140 includes second stage 128 and third stage 130. Third level 142 includes fourth stage 132, fifth stage 134, and sixth stage 136. Different stages of stages 126, 128, 130, 132, 134, and 136 may execute different components of the job, is independent of each other, and may be associated with different compute devices of the distributed processing cluster. Executing one of the stages of the data processing pipeline may include executing one or more components of the job. One or more components of the job may execute serially, in parallel, substantially simultaneously, synchronously, and/or asynchronously at the one or more stages. Additional details associated with operation 122 are discussed in connection with FIGS. 6 and 7, as well as throughout this disclosure.

At operation 144, as a component of the job is being executed at a stage such as any of stages 126, 128, 130, 132, 134, and 136, the execution may encounter an error. Upon encountering the error, the component or the stage may output an error code. Upon outputting an error code, the job may be re-executed at the stage, and a retry budget associated with the job may be decremented. In some examples, there may be a first retry budget associated with errors associated with the distributed processing cluster, a second retry budget associated with job related errors. In some examples, a job related error may include a predefined error such as a user error at the job level or an undefined error at the job level. In some examples, the type of retry budget that is decremented after an error may depend on the type of error. Additional details associated with operation 144 are discussed in connection with FIGS. 6 and 7, as well as throughout this disclosure.

Figure 2:
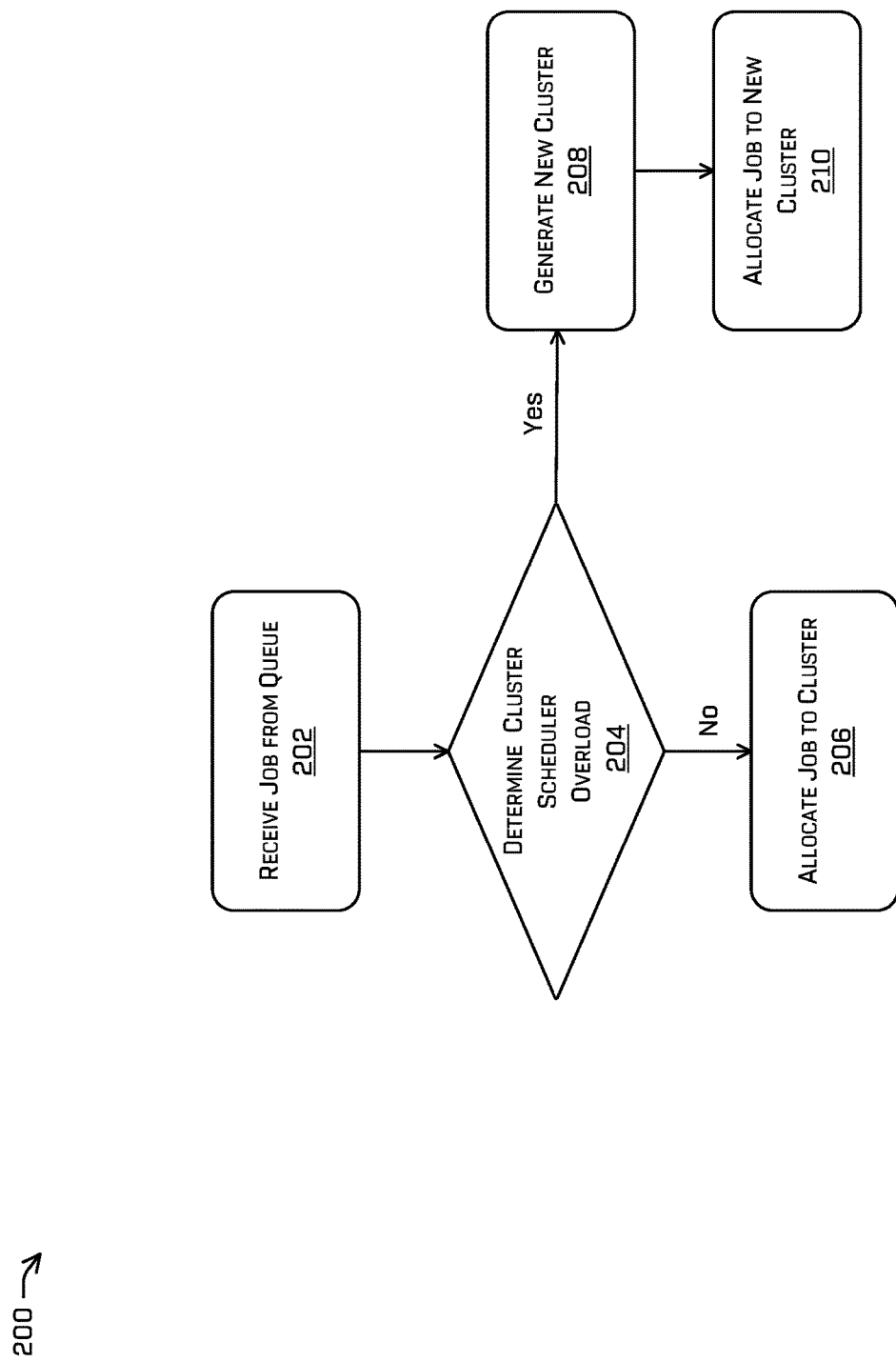
FIG. 2 is an illustration of an example process of horizontally scaling multiple instances of distributed processing clusters based on a state of a scheduler associated with a cluster.

FIG. 2 illustrates an example an example process 200 of horizontally scaling multiple instances of distributed processing clusters based on a state of a scheduler associated with a cluster.

At operation 202, a controller such as a data pipeline allocation component can receive or otherwise select a job from a data pipeline queue. In some examples, the data pipeline allocation component may receive or otherwise select a job from the top of the data pipeline queue. In some examples, the data pipeline scheduling component may receive or otherwise select a job based on the default or primary priority level of the job.

At operation 204, the data pipeline scheduling component can determine whether a cluster scheduling component at a first distributed processing cluster has overloaded based on a scheduling overload threshold. Examples of the scheduling overload threshold may include, but are not limited to, a number of jobs executing at the cluster, the number of jobs within a job queue at the cluster, total job runtime at the cluster, organizational attribution associated with the cluster (e.g., the distributed processing cluster configured to processes jobs associated with a particular component of the vehicle), response time, turnaround time, wait time at the job queue, and the like.

If yes, then at operation 208, the data pipeline allocation component can allocate the job to the first distributed processing cluster. If no, at operation 208, the data pipeline allocation component can set up a new instance of a distributed processing cluster. In some examples, the new instance of the distributed processing cluster may be a clone of the first distributed processing cluster. In some examples, the new instance may be a bespoke distributed processing cluster that is tailored to the needs of the job. In some examples, the data pipeline allocation component may communicate and/or cooperate with a data pipeline scaling component to set up the new instance of the distributed processing cluster. In some examples, the data pipeline allocation component may set up additional new clusters as cluster resources becomes occupied.

At operation 210, the data pipeline allocation component can allocate the job to the new instance. In some examples, the data pipeline scheduling component can allocate the job into a job queue of either the first distributed processing cluster or the new instance.

Figure 3:
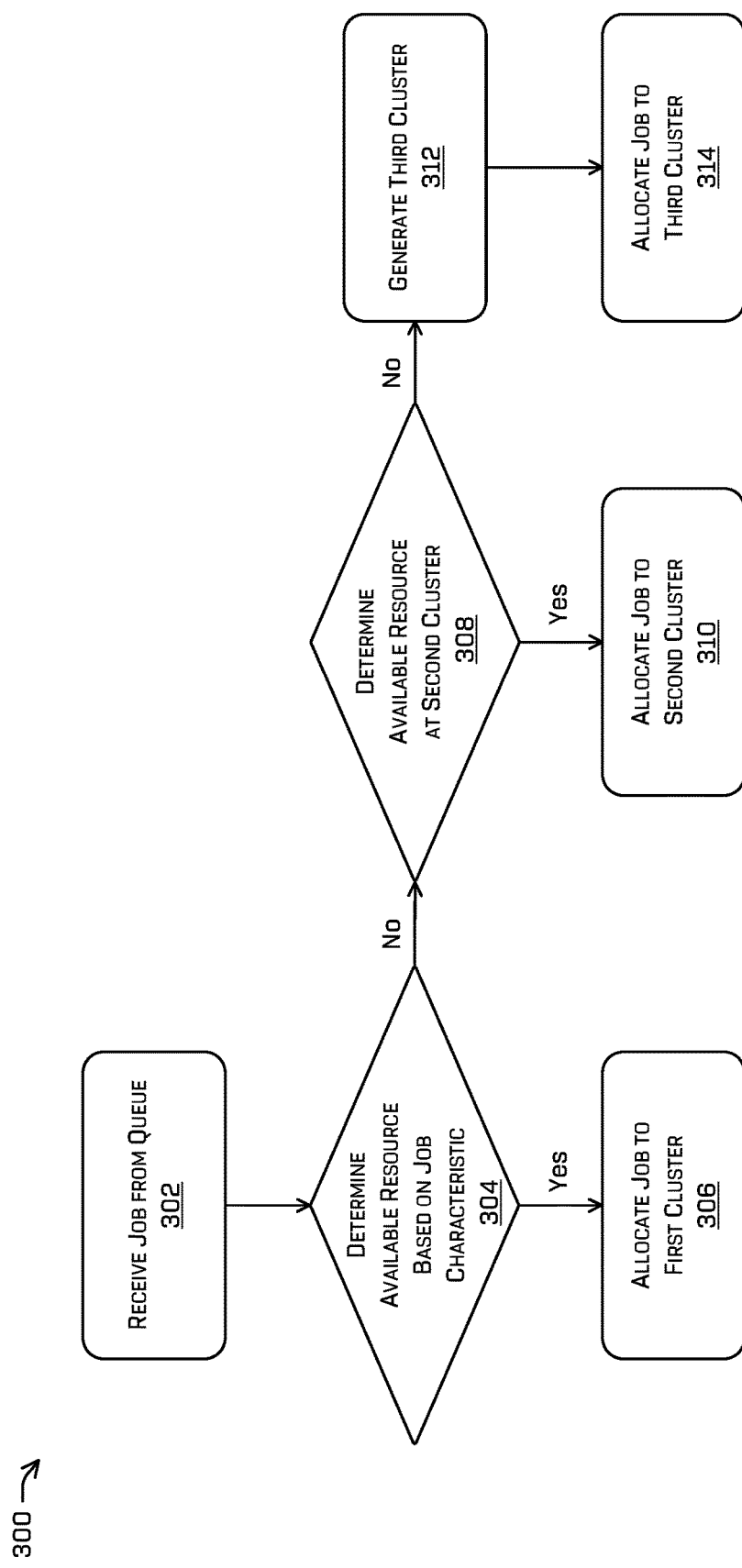
FIG. 3 is an illustration of an example process of horizontally scaling multiple instances of distributed processing clusters based on a job characteristics.

FIG. 3 illustrates an example process 300 of horizontally scaling multiple instances of distributed processing clusters based on job characteristics.

At operation 302, a data pipeline allocation component can receive or otherwise select a job from a data pipeline queue. In some examples, operation 302 may be substantially similar to operation 202. In some examples, operation 302 illustrates that the data pipeline already has a first distributed processing cluster and a second distributed processing cluster. In some examples, the first distributed processing cluster and the second distributed processing cluster may be different instances of a distributed processing cluster. In some examples the first distributed processing cluster and the second distributed processing cluster may include multiple computing components using the same operation system or platform. In some examples, the first distributed processing cluster and the second distributed processing cluster may include multiple computing components using different operation systems, but include virtual instances of the same operation system. In some examples, the first distributed processing cluster and the second distributed processing cluster may include the same hardware and software. In some examples, the first distributed processing cluster and the second distributed processing cluster may include different hardware and software. In some examples, each distributed processing cluster may have hardware and software based on an execution constraint of a particular job. In some examples, multiple jobs may be allocated to and/or executed at each distributed processing cluster. In some examples, each distributed processing cluster may only accept and execute one job. In some examples, the first distributed processing cluster may include local resources and cloud resources while the second distributed processing cluster may include only cloud resources. In some examples, the data pipeline may be configured such that jobs are allocated to the first distributed processing cluster first, and to the second distributed processing cluster when the first distributed processing cluster is unavailable.

At operation 304, the data pipeline scheduling component can determine whether there is available resource at the first distributed processing cluster to execute the job based on a characteristic of the job. In some examples, the characteristic of the job may be preferred hardware for execution, such as CPU, GPU, ASIC, and the like. In some examples, In some examples, the characteristic of the job may include whether the job is of a local type or cloud type. In some examples, whether the job is of a local type or cloud type may be a part of an execution constraint of the job. In some examples, a job of local type may be executed on one or more computing components that are onsite such as at a local server or being on a vehicle. In some examples, a job of cloud type may be executed on one or more computing components that are offsite, such as a plurality of remote computing devices. In some examples, a job may be executed on either onsite or offsite computing components. In examples, where a job may be executed on either onsite or offsite computing components or includes is both a local type and a cloud type, the data pipeline allocation component can allocate the job to any distributed processing cluster with free computing components.

In some examples, the resources may be separated into logical partitions and hardware partitions. In some examples, a hardware partition may be specific to a hardware component. If yes, then at operation 306, the data pipeline allocation component can allocate the job to the default or primary distributed processing cluster. In some examples, operation 308 may be substantially similar to operation 206.

If no, then at operation 308, the data pipeline allocation component can determine whether there is available resource at the second distributed processing cluster. If yes, then at operation 310, the data pipeline allocation component can allocate the job to the second distributed processing cluster. If no, then at operation 312, the data pipeline scheduling component can set up a third distributed processing cluster.

At operation 314, the data pipeline allocation component can allocate the job to the third distributed processing cluster. In some examples, the process to allocating the job to the third distributed processing cluster is the same or similar to operations 306 and 310.

In some examples, there may be a maximum amount of jobs executable at a distributed processing cluster. In some examples, the data pipeline allocation component may determine that an amount of jobs to be executed on the distributed processing cluster (e.g., the number of jobs inside a job queue of the distributed processing cluster) is equal to or greater than the maximum amount of jobs, and set up a new distributed processing cluster. Additionally or alternatively, in some examples, the data processing allocation component can allocate the job based on a first load level of the first distributed processing cluster, a second load level the second distributed processing cluster, and a third load level the third distributed processing cluster. In some examples, the data pipeline allocation component may allocate the job to a distributed processing cluster with a lowest load level. In some examples, the data pipeline allocation component may allocate the job to a distributed processing cluster where the jobs in its job queue is less than the maximum number of jobs.

Figure 4:
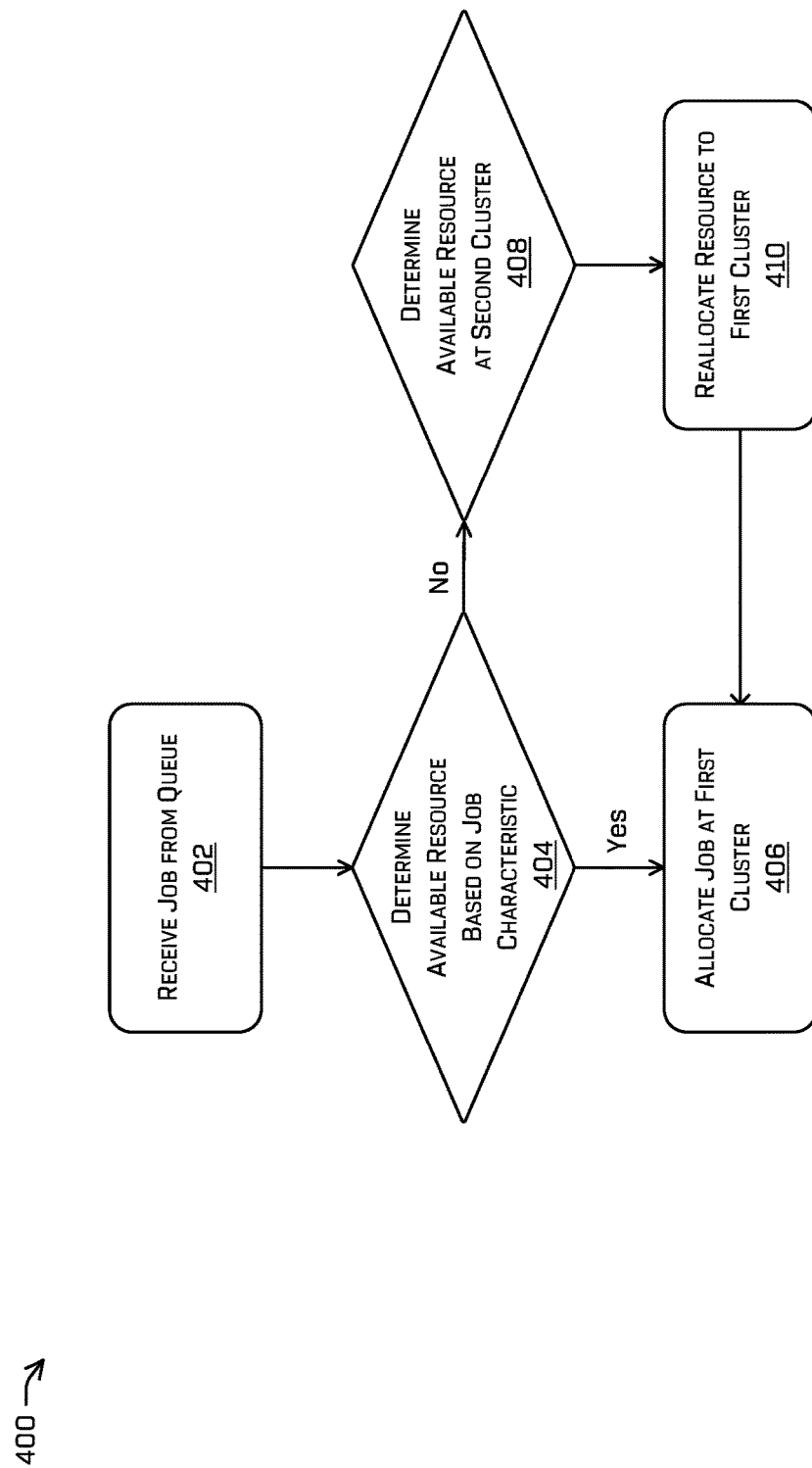
FIG. 4 is an illustration of an example process of reallocating resources between instances of distributed processing clusters.

FIG. 4 illustrates of an example process 400 of reallocating resources between instances of distributed processing clusters.

At operation 402, a data pipeline allocation component can receive or otherwise select a job from a data pipeline queue. In some examples, operation 402 may be same or similar to operation 202.

At operation 404, the data pipeline allocation component can determine whether there is available resource at the first distributed processing cluster to execute the job based on a characteristic of the job. In some examples, operation 404 may be same or similar to operation 302.

If yes, then at operation 406, the data pipeline allocation component can allocate the job to the first distributed processing cluster. In some examples, operation 406 may be similar or same as operation 306. If no, then at operation 408, the data pipeline allocation component can determine whether the resource is available at another distributed processing cluster. At operation 410, the data pipeline allocation component can reallocate the resource from the second distributed processing cluster to the default or primary distributed processing cluster. In some examples, the data pipeline allocation component can traverse different distributed processing clusters to find the available resource. In some examples, once the resource has been reallocated to the first distributed processing cluster, then the data pipeline allocation component can perform operation 406. In some examples, the data pipeline allocation component may dynamically reallocate resources from the first distributed processing cluster to the second distributed processing cluster based on available resources and need.

Figure 5:
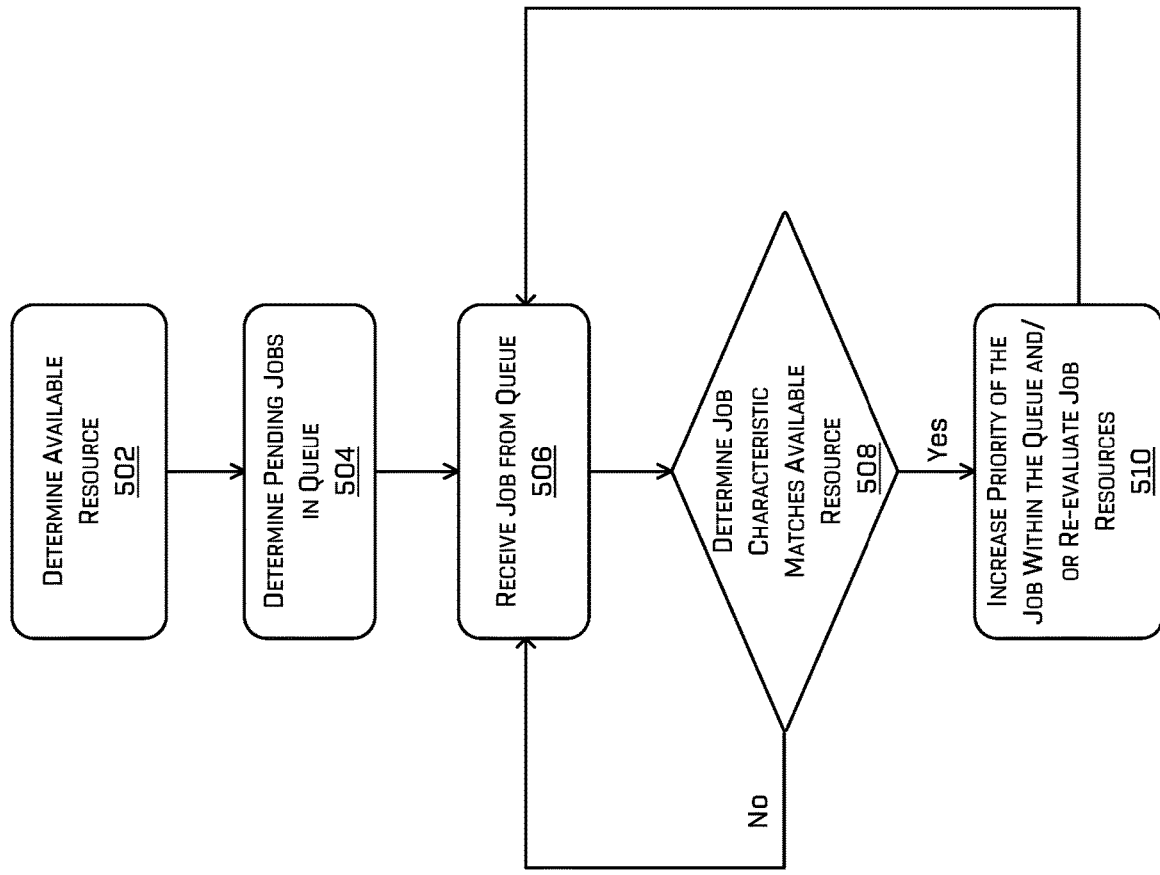
FIG. 5 is an illustration of an example process of allocating the priority of a job within a distributed processing cluster.

FIG. 5 illustrates of an example process 500 of increasing a priority of a job within a job queue of a distributed processing cluster. In some examples, some resources (e.g., GPU) may be in more demand or have less inherently availability, and thereby creating a bottleneck. In some examples, that bottleneck may be due to limits in how much time a cluster scheduling component can spend traversing the queue or how many entries in the queue the cluster scheduling component can traverse through before timing out (e.g., the controller is limited to 2 minutes or is limited to traversing through 30000 queue entries). In some examples, the job queue may be very large, and the total number of entries may exceed the amount of time limited to the controller or the maximum number of entries the controller can traverse. In some examples, the resource can be hardware (e.g. local, cloud, CPU, GPU, and the like) or software based (e.g., execution environment, operation system, and the like). In some examples, the distributed processing cluster may include a plurality of CPU resources and a plurality of GPU resources.

In some examples, the distributed processing clusters may have more CPU resources than GPU resources. In some examples, the job queue may initially have a mixed order of CPU required jobs, GPU required jobs. In some examples, the cluster scheduling component can traverse the queue and execute jobs on CPU and GPU resources in order until all resources on the cluster are filled or resources on the clusters are filled up to a fill threshold. In some examples, because there are more overall availability of CPU resources than GPU resources, once all available GPU resources are filled, the cluster scheduling component may continue to schedule CPU resources from the job queue until all CPU resources are filled, and therefore, in such an example, the job queue may be shaped where the top of the job queue contains all GPU required jobs. In some examples, a job may require both CPU and GPU resources and may require a higher proportion of GPU resources to CPU resources, such as a job associated with training machine learned models. In examples where the job requires both CPU and GPU resources, the cluster would need to have both resources available before such a job may be executed. In some examples, a job may further require additional resources such as fixed function processing resources. In some examples, the amount of GPU required job in the job queue may exceed the amount of queue entries the cluster scheduling component can traverse and/or the amount of time the cluster scheduling component is permitted to spend to traverse the job queue, and thereby may create a scenario that results in idle CPU resources at the distributed processing cluster. In some examples, when such a scenario occurs, a priority allocation component can increase the priority level of CPU related jobs within the queue in order to fill the idle CPU resources with jobs and ensure that the distributed computer cluster is running efficiently by using all of its available resources.

At operation 502, the priority allocation component within the distributed processing cluster can determine an available resource for execution of the job. In some examples, for a CPU required job, the priority allocation component can determine an availability state of a CPU resource. In some examples, for a GPU required job, the priority allocation component can determine an availability state of a GPU resource. In some examples, the priority allocation component may determine the available resource when a job finishes ahead of its estimated or default (predefined) execution time. In some examples, the priority allocation component may continuously monitor resource usages, and dynamically and proactively increase and/or priorities of jobs within the job queue. In some examples, the priority allocation component may use estimated and/or actual completion time of currently executed jobs to predict when a resource may become available.

At operation 504, the priority allocation component can determine the number of pending jobs in the job queue. In some examples, the priority allocation component can determine the number of pending jobs as a list of pending jobs in the job queue. In some examples, the priority allocation component may determine the number of pending jobs in preparations for identifying a job from the job queue in preparations for adjusting a priority of the job.

At operation 506, the priority allocation component can select a job from the job queue to determine whether its execution constraints match an available resource. In some examples, selecting the job may include identifying the job and its execution constraints. In some examples, the cluster allocation component can traverse the queue from the top and select jobs starting from the one at the top of the queue. In some examples, the controller may select the job based on a default priority level of the job. In some examples, the controller may select the job based on its submission date and/or time. In some examples, the controller may select the job based on its name.

At operation 508, the priority allocation component can determine whether the job's characteristic matches an available resources (e.g., the job requires CPU resources and there are CPU resources available). Examples of a job's characteristic may be, but are not limited to, CPU resource, GPU resource, local processing resource, cloud processing resource, virtualized processing resource, non-virtualized processing resource, submission date, name of the job, and the like. If yes, then at operation 510 the controller can increase the priority level of the job within the job queue and/or re-evaluate the amount of resources allocated to the job. For example, the priority allocator component can determine that the distributed processing cluster has free CPU resources, select a job from the job queue, determine that the job requires CPU resources, and based on that determination, increase the priority level of the job within the job queue. If no, then the controller returns to operation 504 and select the next job within the job queue. In some examples, the priority allocation component can adjust the priority of the job and/or re-evaluated the resources allocated to the job, such as widening or narrowing the job as described herein.

In some examples, the priority allocation component can increase the priority level of the job by rearranging the order of jobs within the job queue. For example, if there are free CPU resources or the controller anticipates that CPU resources will become available, the priority allocation component can reorder the job queue so that CPU required jobs are at the top of the queue instead of GPU required jobs. In some examples, the priority allocation component can adjust the priority level through a combination of increasing the priority level of jobs requiring available resources while also decreasing the priority level of all other jobs. In some examples, the priority allocation component can adjust the priority level based on submission date and/or time where the job queue may be rearrange such that the newest job by its submission date and/or time may be at the top of the queue or given the highest priority level while the oldest job by its submission date and/or time may be at the bottom of the queue or given the lowest priority level.

In some examples, the priority allocation component can adjust the priority level based on a name of the job. In some examples, the priority level may be arranged such that the jobs are in alphabetical order within the queue, either forward or backward. In some examples, the name of the job may contain standardized monikers that are indicative of a type of job and/or a priority level, and therefore, the priority allocation component can adjust the priority level such that the job with the name that have the highest priority are at the top of the job queue and/or given the highest priority level. In some examples, adjusting the priority level of the job based on its submission date and/or its name and other execution constraints (e.g., increasing the priority level of the oldest CPU required job).

In some examples, in the event that a job may require multiple types of processing resources (e.g., requiring both CPU and GPU resources), the processing resource that is currently unavailable at the distributed processing cluster (e.g., GPU) would determine the priority level of the job. In some examples, the priority level may be based on other execution constraints such as whether the job requires local resources, cloud resources, or is agnostic between the two, as well as security, cost, time of completion, and the like.

Additionally or alternatively, when the priority allocation component determines that there are available resources, instead of executing new jobs on those available resource, the priority allocation component can widen a currently executing job by allocating more available resources to the currently executing job. In some examples, widening the currently executing job can decrease its completion time. In some examples, the priority allocation component can narrow the currently executing job by withholding resources from the currently executing job wherein the currently executing job when narrowed utilizes less resources than before. In some examples, narrowing the currently executing job can free up resources to allocate to other jobs in the queue to execute. In some examples, the priority allocation component can set a threshold on the amount of resources that a job can utilize when widening (e.g., 80% of total resource at the distributed compute cluster). In some examples, the threshold may be set by a user. In some examples, the threshold can ensure that there would be sufficient available free resources to execute emergency or expedited level priority jobs on the distributed processing cluster. In some examples, when there are multiple jobs being executed at the distributed processing cluster, the priority allocation component can dynamically widen and/or narrow a job based on available resources and the priority level of the job.

Figure 6:
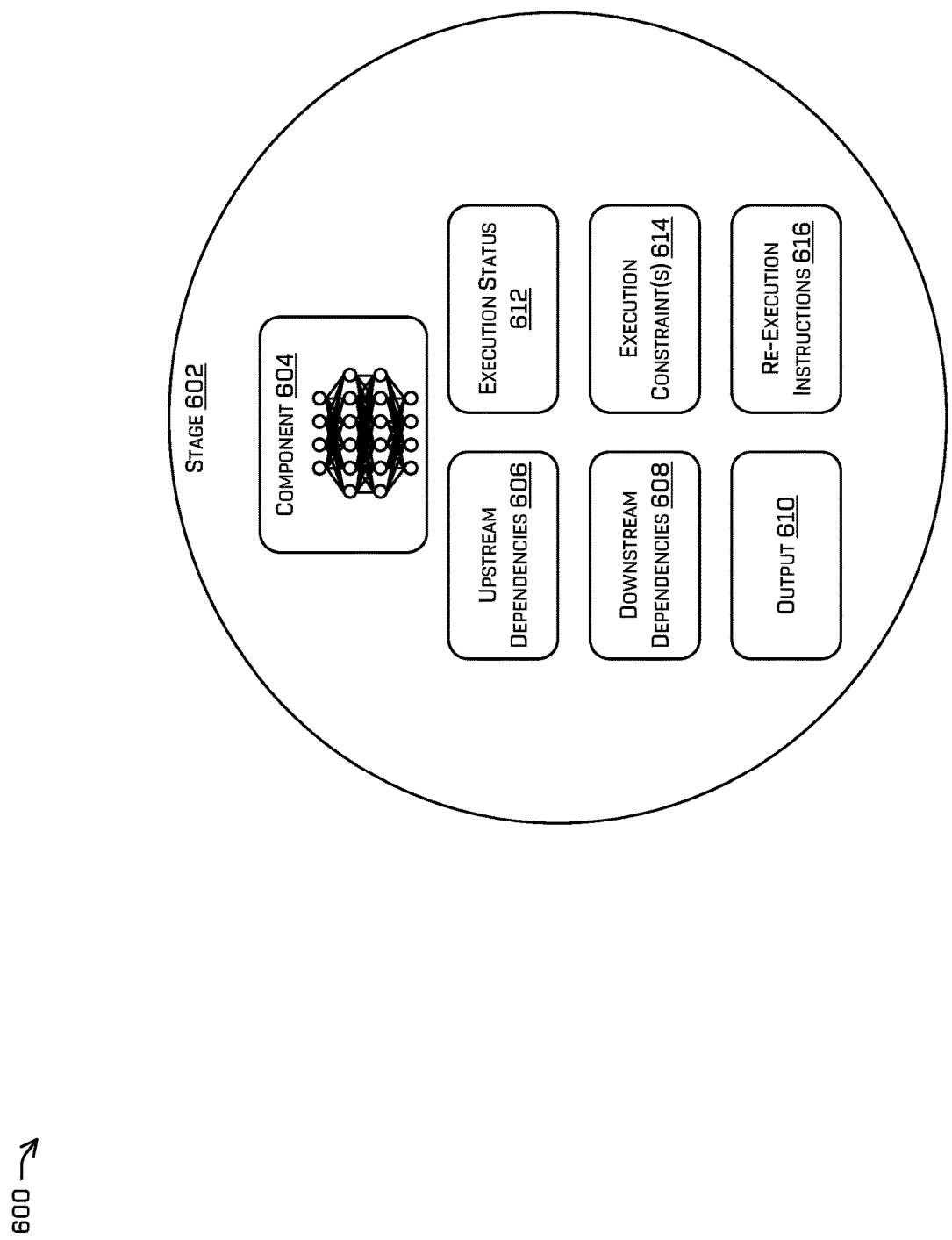
FIG. 6 is an example syntax for a stage of a data processing pipeline.

FIG. 6 illustrates an example syntax 600 for a stage 602 of a data processing pipeline. In some examples, a job may be executed at a distributed processing cluster based on a compute graph. In some examples, stage 602 may be a stage of the compute graph. In some examples, the compute graph may include a DAG (direct acyclic graph) of stages (e.g., multiple stages in a tree structure where a stage may include one or more downstream and/or upstream dependencies). In some instances, executing stage 602 may be associated with executing one component of the job. In some examples, executing stage 602 may be associated with executing multiple components of the job. Stage 602 may be associated with a component 604. In some instances, example syntax 600 may comprise a programming language for defining characteristics of the component 604 and/or the job associated therewith. In some examples, stage 602 may be an object and/or data structure defined by the example syntax 600 associated with component 604. In some examples, a job may be executed within a container at stage 602.

In some examples, stage 602 may point to executable instructions stored in memory (e.g., binary code for an executable process, an executable thread, a machine-learned model). In some examples, stage 602 may contain executable instructions itself, and/or may otherwise reference the component 604 and/or its functions (e.g., using a MAC address for a hardware portion of the component, an Internet Protocol (IP) address, a virtual private cloud (VPC) identifier). In some examples, stage 602 may identify a type associated with the component 604, e.g., software, hardware, machine-learned model, some combination thereof.

In some examples, stage 602 may additionally or alternatively define one or more upstream dependencies 606 associated with the component 604 and/or one or more downstream dependencies 608 associated with the component 604. For example, example syntax 600 may receive an argument to define an upstream component(s) from which the component 604 receives an output, as an input to the component 604, and/or downstream dependencies 608 that receives an output of execution of the component 604. In some instances, the upstream dependencies 606 may additionally define whether an output associated with an upstream component is optional and/or necessary for the component 604 to operate. In some examples, if an output of another component is necessary, but that output is not received during execution, the techniques may comprise generating a fatal failure and/or delaying execution/re-execution of the component until the output is received.

In some examples, stage 602 may additionally or alternatively define an output 610 of the component 604. In some examples, the output 610 may define a type of the output (e.g., analog signal, digital signal, mechanical actuation, file type(s), general description, such as video, image, point cloud) and/or other characteristics of the output (e.g., a normal range of values associated with the output, a number of output(s), a period associated with the output, such as a number of compute cycles to expect an output). In some examples, regardless of whether a component executes successfully, an execution management component may store an internal state of the component during and/or after an execution of the component. In some examples, an internal state may comprise variable values, counter values, weights of a neural network, partially-processed outputs, prior values, and the like. The internal state saved may be sufficient to resume execution of the component at a point in execution, while preserving the determinism of the output (e.g., the internal state is saved so that the resultant output would not be different, regardless of being resumed). The internal state may therefore be defined per component or per type of component, since the internal states required to resume execution may be different between two different components. During run-time, stage 602 may additionally or alternatively identify, at the definition of the output 610, whether the component 604 generated an output responsive to being executed and/or whether the output generated by the component 604 was stored and/or is retrievable from a memory.

In some examples, stage 602 may additionally or alternatively define an execution status 612 of the component 604. For example, the execution status 612 may define possible execution states of the component 604 and/or, during run-time, the execution status 612 may identify a current and/or last execution status of the component 604. In some examples, the execution status 612 may comprise an exit code of a scheduling component and/or the execution status 612 may be associated with an exit code of a scheduling component. For example, there may be multiple exit codes that may be associated with a simplified status such as "failed." The execution status 612 may identify the exit code and/or a simplified status.

In some examples, an exit code may indicate different results of scheduling a component to execute. In some examples, an exit code may comprise, but is not limited to, an indication that the component is ready to execute at a scheduled time, the component is currently executing, no additional executions are scheduled in association with the component, a time has not been scheduled for the component to be executed due to higher priority components that are to be executed, execution of the component was terminated by a user and/or another process, execution of the component failed due to hardware failure, execution of the component failed due to a software failure (e.g., a segmentation fault, network unavailability of remotely stored data, etc.), execution of the component was terminated by a user and/or a process, execution of the component was paused, the component could not be found, a database associated with the component was corrupted, an argument of the component is out of range, an instance of the component was already running, the scheduling component is too busy to handle the request to execute a component, the component is not compatible with hardware and/or software upon which the scheduling component scheduled the component to be executed, and the like.

In some examples, a simplified status may comprise, but are not limited to, execution pending, scheduled, successful, paused, canceled, failed, fatally failed, and the like. It is understood that the statuses may include less and/or more statuses. Moreover, the statuses may be hierarchical (e.g., failure may be a parent to canceled, network unavailable, no input received, and the like). A fatal failure may differ from a failure in that a fatal failure may be unrecoverable. For example, a component may fatally fail by being scheduled on a machine that does not have hardware that the component must execute on, the component does not receive an input necessary to execute, etc. In some example, an execution management component may receive an exit code from a scheduling component based at least in part on causing the component 604 to be executed and may store the exit code and/or status in association with the compute graph node 602/component 604. In some examples, the execution management component may additionally or alternatively store a status independently of receiving an exit code (e.g., storing "execution pending" before causing the component 604 to be executed, storing a "failure" or "error" status upon detecting a hardware failure and/or software corruption).

In some examples, the execution status 612 may include ancillary data such as, for example, a time that the component 604 was scheduled to execute, started executing, finished executing, and the like, an environment in which the component 604 was executed (e.g., a machine that executed the component 604, hardware associated with the execution), a reason for failure of the component 604 (e.g., this may be determined from an exit code and/or other information determined by a monitoring service). In some examples, the reason for failure may include information associated with an exit code, an indication of hardware unavailability (e.g., a disk died, a disk is full, a processor was unavailable, a machine was physically interfered with), identification of an input/output bottleneck, and the like.

In some examples, stage 602 may additionally or alternatively define execution constraint(s) 614 associated with the component 604. In some examples, the execution constraint(s) 614 may define an operational environment for executing the component 604. In some examples, the execution constraint(s) 614 may comprise, but are not limited to, preferred and/or required hardware upon which to execute the component 604 (e.g., CPU, GPU, ASIC), an environment type associated with the component 604 (e.g., hyperthreading permitted/not permitted, operating system type, license availability(ies) and/or restrictions on execution(s), compute budgetary limitations (e.g., cloud computing budgetary constraints for number of requests sent to a cloud computing service, compute time, machine(s) used, permissions to increase an expense tier of cloud computing usage), hardware operational level, such as firmware, middleware, user-space, virtual machine allowed/disallowed), a computational threshold (e.g., a minimum amount of memory, a minimum processor speed, a network availability (e.g., minimum network bandwidth, a maximum latency), a storage requirement (e.g., available RAM space, available disk space, memory read and/or write speed), machine topology (e.g., GPU must be connected by a PCIe connection instead of via a main bus, the machine is/is not a virtual machine), cluster topology (e.g., processor(s) must be located in a same rack of a cloud computing service to minimize an I/O bottleneck, component must not be run on machine more than one rack away from a service), an error tolerance threshold for qubit information, a physical threshold (e.g., a maximum and/or minimum temperature for executing a software and/or hardware component), a minimum security requirement (e.g., authentication and/or security elevation required to execute a component), and the like.

In some examples, a permutation of the execution constraint(s) 614 may define a computational environment and the execution constraint(s) 614 may define one or more permutations of computational environments in which a component may be executed. In some examples, permutation(s) of the computational environments may be prioritized and/or otherwise indicated as more or less preferred. In some examples, the execution constraint(s) 614 may identify an input consumed by the component 604 as input (e.g., a drive signal that causes a drive system to cause an autonomous vehicle to move, perception data such as a bounding box, image segmentation, semantic label, segmented point cloud, and the like) and/or an indication of whether the input is necessary and/or preferred for execution of the component 604.

In some examples, an execution management component may use the execution constraint(s) 614 and/or information received from a device executing the component 604 to determine an execution status 612. For example, the execution management component may store an "incompatible environment" or "compatible environment" status in addition or alternatively to the execution status 612.

In some examples, stage 602 may additionally or alternatively define re-execution instructions 616. Upon determining that the component 604 did not execute successfully, the execution management component may check the re-execution instructions 616. In some examples, the re-execution instructions 616 may be null, which may allow the execution management component to follow a default or primary re-execution procedure, and/or the re-execution instructions 616 may indicate that a component should not be re-executed if it was previously executed. In some examples, the re-execution instructions 616 may include re-executing the stage. In some examples, the re-execution instructions 616 may include sending the job or one or more components of the job back into a job queue of the distributed processing cluster for re-execution, wherein such a re-execution from the job queue may allow one or more components of the job to be re-executed at a different stage and/or at a different computing component. In some examples, the re-execution instruction 616 may include different hierarchy of re-execution instructions. In some examples, re-executing at the stage may be a higher hierarchy and therefore would be first tried before sending the job back to the job queue.

In some examples, the re-execution instructions 616 may indicate decrementing a retry budget. In some examples, the retry budget may define a number of times to re-execute the component 604 after the component 604 fails execute successfully before taking a different action other than attempting re-execution. In some examples, the retry budget may be decremented even if a different action is taken. In some examples, the retry budget may be associated with the entire data processing pipeline. In some examples, there may be multiple retry budget pools. In some examples, there may be a first retry budget associated with an error associated with a distributed compute cluster and a second retry budget associated with errors at the job level such as a predefined or user error or an undefined error. In some examples, the retry budget may be user defined. In some examples, the retry budget may be defined based on job type (e.g., different job types have different amount of retry budget) or user profile (e.g., each user may have a profile associated with an amount of retry budget). In some examples, the data processing pipeline may include a default amount of retry budget. In some examples, the retry budget may be determined and/or adjusted based on the amount of free resources at the distributed processing cluster. For example, when the distributed processing cluster has additional free resources available, the total retry budget may be increased, and when there are less free resources available, the total retry budget may be decreased. In some examples, upon exhaustion of the retry budget (e.g., the number of times the component has been retried meets the number of retries defined by the retry budget), instructions following failure (e.g., whether to re-execute, what to do when the retry budget is exhausted, instructions to output a default or primary (pre-defined) output instead of an output determined by the component, instructions to output a fatal failure) may be executed.

In some examples, the re-execution instructions 616 may associate different exit codes (or other reasons for failure) with different re-execution instructions 616. For example, an exit code identifying a disk failure may be associated with an instruction to migrate machines before re-executing; an exit code identifying the processor as being too busy to execute the component 604 may be associated with an instruction to retry at a later time, migrate to a different processor, and the like; an exit code identifying the component 604 as timing out waiting to receive an input may be associated with an instruction to determine whether an upstream component executed successfully, determine whether a network and/or input/output connection is working properly, determine whether an output associated with an upstream component was stored, and the like; an exit code associated with pausing execution of the component may be associated with an instruction to re-execute and/or execute from a saved internal state of the component 604; and the like.

In some examples, the re-execution instructions 616 may additionally or alternatively comprise an instruction to replace a current compute graph with an alternate compute graph (and/or alternate stages). In some examples, the re-execution instructions 616 may additionally or alternatively identify hard dependencies (e.g., input(s) from the upstream component is required for a component to execute successfully, a minimum required set of successfully executed component(s)) and/or soft dependencies (e.g. input(s) from the upstream component is not required for successful execution, but may be used by the component as an input). In some examples, a hard dependency may be defined by identifying a minimum number of upstream component(s) and/or particular upstream component(s) required for a component to execute and/or re-execute. In some examples, the re-execution instructions 616 may additionally or alternatively comprise an instruction to branch to a new process (e.g., a debug tool, an alternate version of a component, a different machine in examples where the component comprises hardware).

Figure 7:
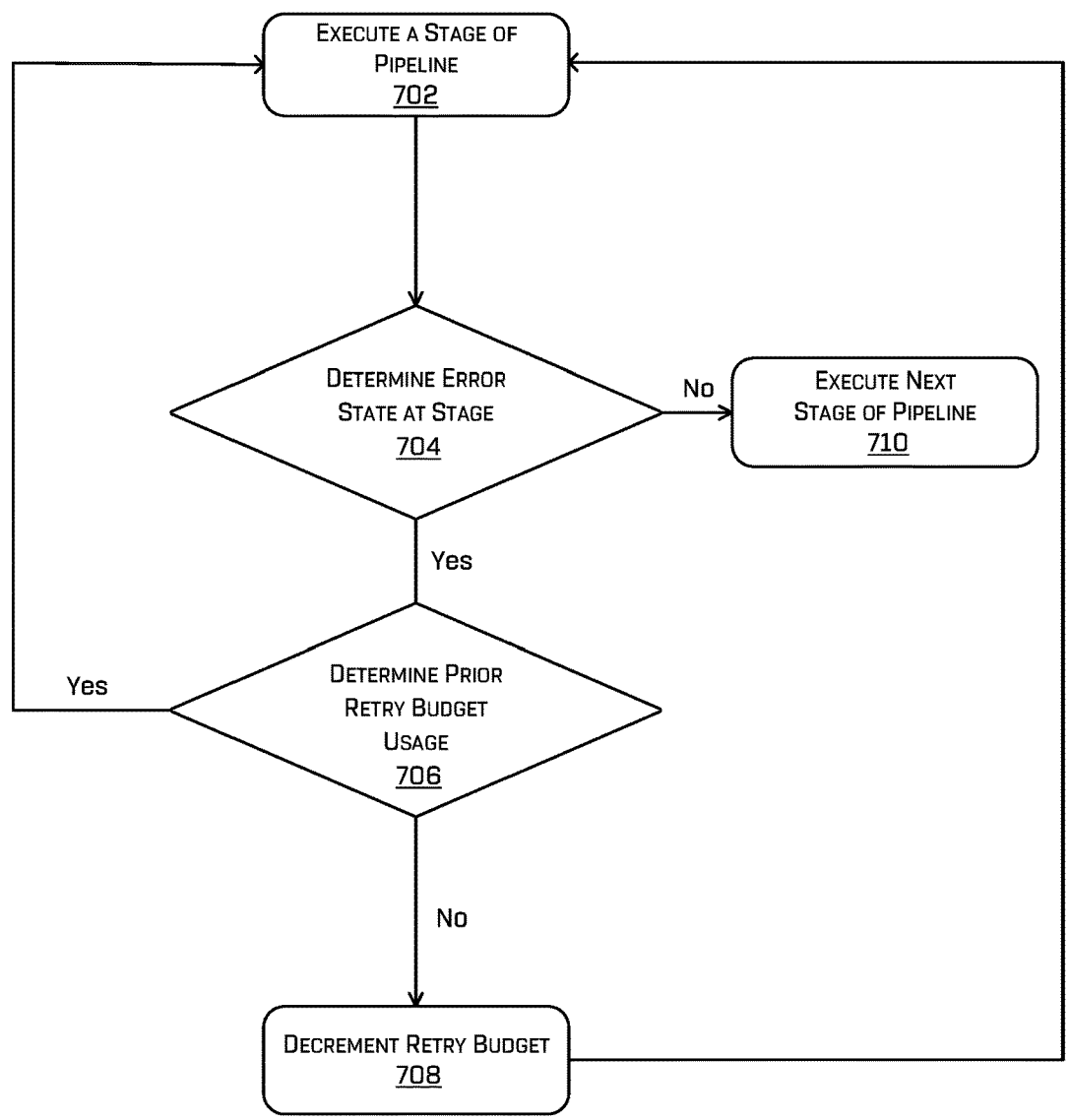
FIG. 7 is an illustration of an example process for recovering from an error at a stage while executing a job.

FIG. 7 is an illustration of an example process 700 for recovering from an error at a stage while executing a job. In some examples, the stage may be stage 602.

At operation 702, a job can be executed at the stage. In some examples, the job may be executed at one stage. In some examples, the job may be executed at multiple stages in parallel. In some examples, one or more components of the job may be executed at the stage.

At operation 704, the stage can output an exit code. In some examples, a scheduling component of a distributed processing cluster, such as the first scheduling component 114, that the stage is executed on may receive the exit code. In some examples, the exit code may be associated with one or more errors, error codes, or error states. In some examples, a controller, such as an execution management component of a stage or a separate error recovery component, can determine whether the exit code is associated with an error. In some examples, the exit code, error, error code, or error state may be transmitted or written to a log file. In some examples, a classification of the error (e.g., error associated with a distributed processing cluster, an user error, an unknown error, and the like) may be determined based on the exit code, the error, the error code, the error state, or from the log file. If yes, then at operation 706, the controller can determine whether there was prior retry budget usage at one of the other stages at the same level of the compute graph. If no, and/or the exit code indicates successful execution, then at operation 710, then the job can be executed at the next stage according to its execution instructions.

At operation 706, the controller can determine whether a retry budget was used at another stage within the same compute graph level as the stage prior to the error. In some examples, if the controller determines that the retry budget was used at another stage, then the retry budget would not be further decremented, and the job may be re-executed at operation 708. In some examples, as stages at the same compute graph level are being re-executed, an aggregate retry may be updated. In some examples, the aggregate retry may be indicative of a highest re-execution amount at any particular stage of the compute graph level. In some examples, the aggregate retry starts at zero. For example, if second stage 128 of FIG. 1 re-executed three times and third stage 130 of FIG. 1 re-executed once then the aggregate retry is three because the highest number of re-executions at any particular stage of the compute graph level is three. However, if later, second stage 128's re-execution number remains three, but third stage 130's re-execution number is now four. Then the aggregate retry becomes four. In some examples, if the amount of re-execution at the stage exceeds the aggregate retry, then operation 708 would be performed to decrement the retry budget prior to re-executing operation 702. In some examples, if the amount of re-execution at the stage does not exceed the aggregate retry (e.g., less than or equal to) then operation 702 may be re-executed without decrementing the retry budget.

In some examples, there may be an infra retry budget and a job retry budget. In some examples, infra error budget may be associated with an intermittent error at the distributed processing component level. In some examples, a job retry budget may be associated with errors at a job level. In some examples, the controller can additionally or alternatively identify whether the exit code is associated with an undefined error at the job level or a predefined error at the job level. In some examples, predefined errors may be user defined. In some examples, a failure or error may be classified as an infra error, a predefined error, or an undefined error. In some examples, the infra error may be an intermittent error at the distributed processing component level, and therefore not associated with any particular job (e.g., an error that only exhibit itself from time to time without consistency). In some examples, the infra error may be an error at the data processing pipeline level, and therefore not associated with any particular job (e.g., the stage outputs an exit code, but a container associated with the job is still active when the container should have exited the stage). In some examples, a predefined error may be based on user input. In some examples, a predefined error may be a user error. In some examples, the controller can dynamically reclassify an undefined error as a predefined error (e.g. through user input, a machine learned model, and the like).

In some examples, the stage may output an exit code, but a container associated with the job may still be active. In such a scenario, the controller can continuously monitor the stage for whether the container is active and has lapsed for a predetermined time period (e.g. 20 minutes). In some examples, once the container is active for the predetermined time period, then the controller can force the job to exit the stage. Once the job exits the stage, the job can either be re-executed at operation 702, can be executed at an alternate stage, or can stop execution based on its execution instructions and/or whether the retry budget is exhausted. In some examples, the predetermined time period may be an infra time period or a user defined time period. In some examples, the infra time period may be associated with an infra error. In some examples, the user defined time period may be associated with all other errors.

Figure 8:
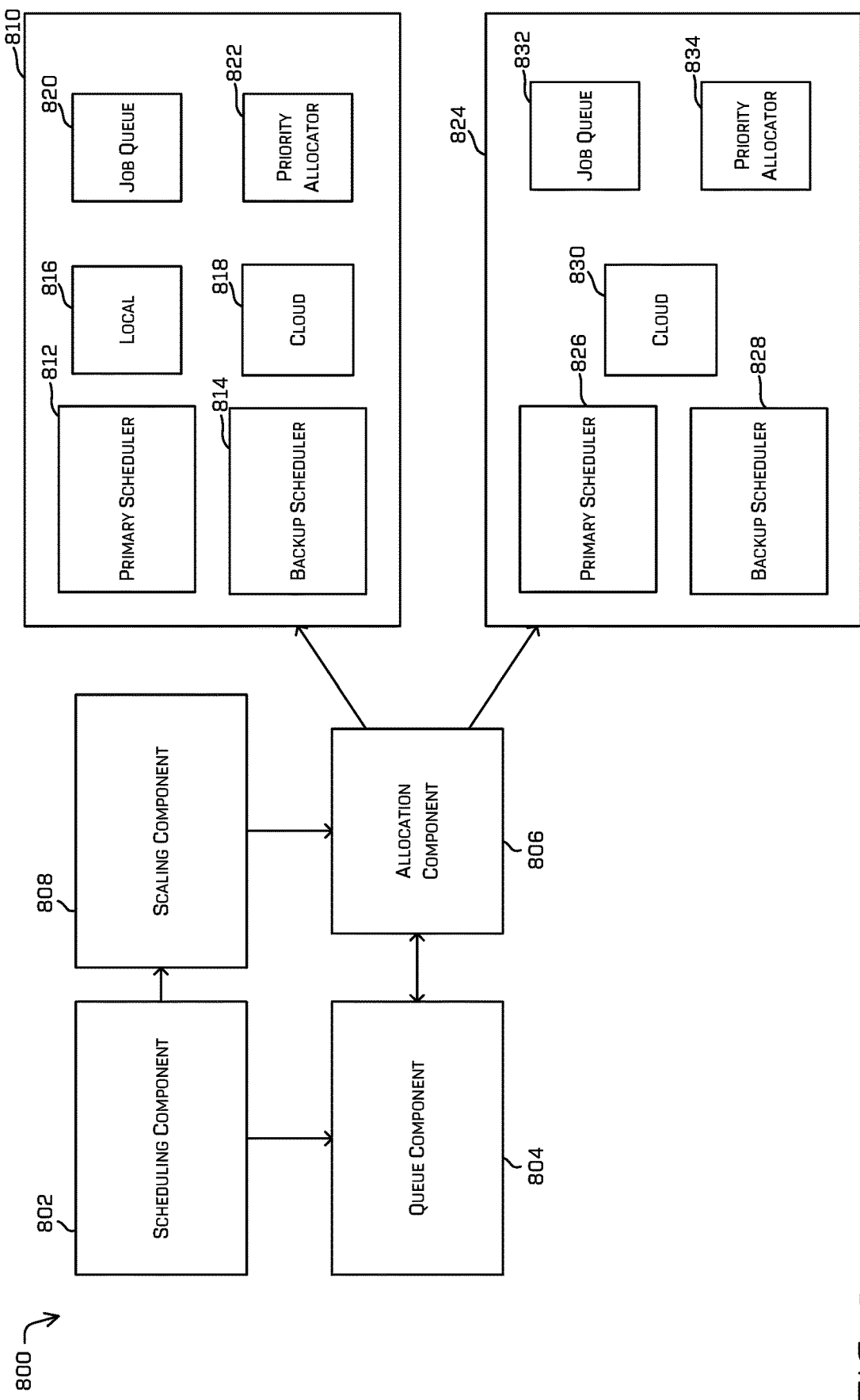
FIG. 8 is an illustration of an example architecture of a data processing pipeline, as described herein.

FIG. 8 illustrates an example architecture 800 of a data processing pipeline. The pipeline includes a pipeline scheduling component 802, a pipeline queue component 804, a pipeline allocation component 806, a pipeline scaling component 808, a first cluster 810, and a second distributed cluster 824. The first cluster 810 further includes a first primary cluster scheduler 812, a first backup cluster scheduler 814, local resource 816, cloud resource 818, a job queue 820, and a priority allocation component 822. The second cluster 824 includes a first primary cluster scheduler 826, a first backup cluster scheduler 828, cloud resource 830, a job queue 832, and a priority allocation component 834. In some examples, the first and second clusters 810 and 824 may include logical partitions and hardware partitions. In some examples, the first and second clusters may be distributed processing clusters as described throughout this disclosure. While pipeline scheduling component 802, pipeline allocation component 806, and pipeline scaling component 808 are illustrated as separate components in FIG. 8, the pipeline allocation component 806 and pipeline scaling component 808 may be incorporated into scheduling component 802. In some examples, pipeline scheduling component 802 may receive jobs and may place them in pipeline queue component 804 as described throughout this disclosure. In some examples, the pipeline allocation component 806 may allocate jobs from the queue to either the first cluster 810 or the second cluster 824 as described throughout this disclosure. In some examples, pipeline scaling component 808 may aid the pipeline allocator component in setting up additional instances of distributed processing clusters as described throughout this disclosure, such as setting up second cluster 824. Additional disclosure related to FIG. 8 may be found at FIGS. 1-6, as well as throughout this disclosure.

Figure 9:
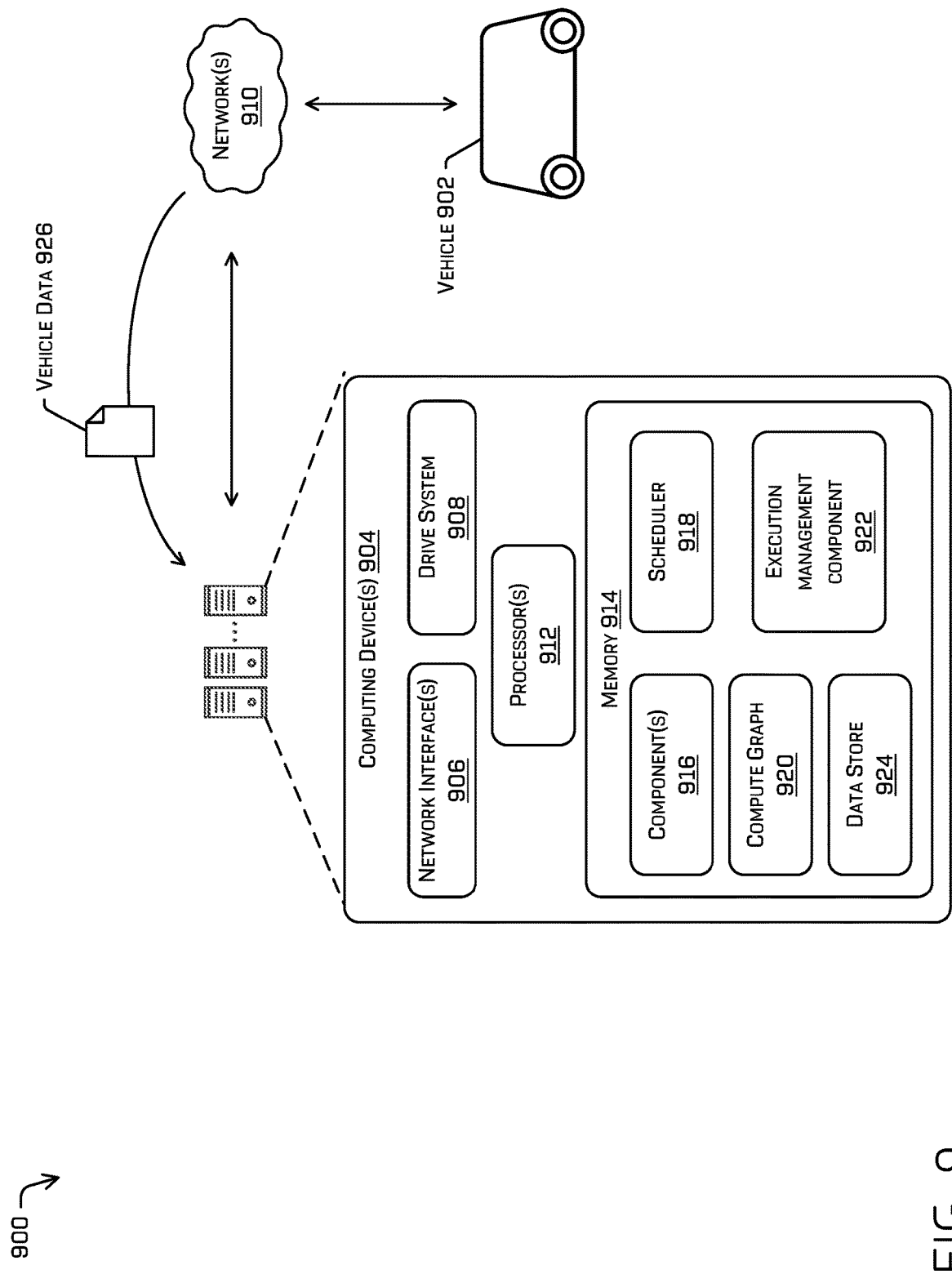
FIG. 9 is an illustration of an example architecture that implements the data pipeline execution techniques, as described herein.

FIG. 9 illustrates an example architecture 900 that implements the data pipeline execution techniques discussed herein. In some instances, the example architecture 900 may include a vehicle 902, which may correspond to an autonomous vehicle. In some instances, the vehicle 902 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 902 may be a fully or partially autonomous vehicle having any other level or classification. Moreover, in some instances, the techniques described herein may be usable by non-autonomous vehicles as well.

In some examples, the example architecture 900 may additionally or alternatively comprise computing device(s) 904. In some examples, vehicle 902 may comprise the computing device(s) 904. In some examples, the computing device(s) 904 may comprise a remote distributed processing clusters (e.g., a cloud computing architecture).

The computing device(s) 904 may include network interface(s) 906 that enable communication between the vehicle 902 and one or more other local or remote computing device(s). For instance, the network interface(s) 906 may facilitate communication with other local computing device(s) on the vehicle 902 and/or a drive system 908, in examples where the vehicle 902 comprises the computing device(s) 904. Also, the network interface (s) 906 may additionally or alternatively allow the computing device(s) 904 to communicate with other nearby computing device(s) (e.g., other nearby vehicles, traffic signals, and the like). The network interface(s) 906 may additionally or alternatively enable the vehicle 902 to communicate with computing device(s) 904.

The network interface(s) 906 may include physical and/or logical interfaces for connecting the computing device(s) 904 to another computing device or a network, such as network(s) 910. For example, the network interface(s) 906 may enable Wi-Fi-based communication such as via frequencies defined by the IEEE 800.11 standards, short range wireless frequencies such as Bluetooth®, cellular communication (e.g., 2G, 3G, 4G, 4G LTE, 5G, and the like) or any suitable wired or wireless communications protocol that enables the respective computing device to interface with the other computing device(s). In examples where the computing device(s) 904 are remote computing device(s), the vehicle 902 may send vehicle data 926, via the network(s) 910, to the computing device(s) 904 at a particular frequency, after a lapse of a predetermined period of time, in near real-time, and the like.

In some examples, vehicle data 926 may comprise sensor data received from sensor(s) of the vehicle 902 such as, for example, light detection and ranging (LIDAR) sensors, RADAR sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), cameras (e.g., red-green-blue (RGB), infrared (IR), intensity, depth, time of flight, etc.), microphones, wheel encoders, environment sensors (e.g., temperature sensors, humidity sensors, light sensors, pressure sensors, and the like), and the like. The sensor(s) may include multiple instances of these or other types of sensors.

In examples where the vehicle 902 includes the computing device(s) 904, the computing device(s) 904 may include a drive system 908. In some instances, the drive system 908 may include one or more sensors to detect conditions of the drive system 908 and/or the surroundings of the vehicle 902. By way of example and not limitation, the sensor(s) of the drive system 908 may include one or more wheel encoders (e.g., rotary encoders) to sense rotation of the wheels of the drive modules, inertial sensors (e.g., inertial measurement units, accelerometers, gyroscopes, magnetometers, and the like) to measure orientation and acceleration of the drive module, cameras or other image sensors, ultrasonic sensors to acoustically detect objects in the surroundings of the drive module, LIDAR sensors, RADAR sensors, and the like. Some sensors, such as the wheel encoders may be unique to the drive system 908. In some cases, the sensor(s) on the drive system 908 may overlap or supplement corresponding systems of the vehicle 902 (e.g., sensor(s) discussed above).

The drive system 908 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, and the like). Additionally, the drive system 908 may include a drive module controller which may receive and preprocess data from the sensor(s) and to control operation of the various vehicle systems. In some instances, the drive module controller may include one or more processors and memory communicatively coupled with the processor(s) 912. The memory 914 may store instructions to perform various functionalities of the drive system 908. Furthermore, the drive system 908 may also include one or more communication connection(s) that enable communication by the respective drive module with one or more other local or remote computing device(s).

The computing device(s) 904 may include one or more processor(s) 912 and memory 914 communicatively coupled with the one or more processor(s) 912. The processor(s) 912 may be any suitable processor capable of executing instructions to process data and perform operations as described herein. By way of example and not limitation, the processor(s) 912 may comprise one or more central processing units (CPUs), graphics processing units (GPUs), integrated circuits (e.g., application-specific integrated circuits (ASICs), etc.), gate arrays (e.g., field-programmable gate arrays (FPGAs), and the like), and/or any other device or portion of a device that processes electronic data to transform that electronic data into other electronic data that may be stored in registers and/or memory.

Memory 914 may be an example of non-transitory computer-readable media. The memory 914 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 914 may store component(s) 916 such as, for example, component(s) of a primary perception system, a secondary perception system, a prediction system, a localization system, a mapping system, a planning system, a ride management system, a training data mining system, a machine-learned model training system, a log generating system, and the like. These (and other) system(s) may comprise a variety of components that make up a job/data processing pipeline. Although component(s) 916 are illustrated as being stored in memory 914, component(s) 916 may include processor-executable instructions, machine-learned model(s) (e.g., a neural network), and/or hardware.

As described herein, an exemplary neural network is a biologically inspired algorithm which passes input data through a series of connected layers to produce an output. A layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, and the like. Additional examples of architectures include neural networks such as ResNet50, ResNet101, VGG, DenseNet, PointNet, and the like.

Memory 914 may additionally or alternatively store a scheduling component 918, a compute graph 920, and/or an execution management component 922. Memory 914 may additionally or alternatively comprise a data store 924. In some examples, the data store 924 may be separate from memory 914 (e.g., accessible via network(s) 910). In some examples, the scheduling component 918 may be a scheduling component associated with a processor, operating system, hypervisor, and/or the like. The scheduling component 918 and/or hardware associated therewith may maintain an execution queue. The execution management component 922 may coordinate with the scheduling component 918 to add component(s) of a job to the execution queue. In some examples, the execution management component 922 may cause the scheduling component 918 to start running a job and may update execution status(es) stored in the compute graph 920 and/or store output(s) in the data store 924 responsive to component(s) executing. In some examples, updating the execution status(es) may be based at least in part on exit code(s) received from the scheduling component 918.

In some examples, when the execution management component 922 detects that a component failed to execute successfully, the execution management component 922 may, instead of allowing the scheduling component 918 to run the job according to a configuration of the scheduling component 918, provide the specific components to be run and/or an order thereof to the scheduling component 918. Allowing the scheduling component 918 to re-execute a component according to a default or primary configuration of the scheduling component 918 may result in re-executing the entire job, which duplicates computations compared to the techniques discussed herein. In some examples, the execution management component 922 may transmit to the scheduling component 918 information associated with a compute graph node in addition to instructions to execute a component associated with the compute graph node.

In some examples, the compute graph 920 may comprise a primary compute graph and/or one or more alternate compute graphs. In some examples, based at least in part on determining to re-execute a component, the execution management component 922 may determine to replace the primary compute graph with an alternate compute graph based at least in part on re-execution instructions stored in association with the job or a component of the job.

EXAMPLE CLAUSES

A: A system comprising: a distributed processing environment comprising a plurality of central processing components and a plurality of parallel processing components; a scheduling component associated with the distributed processing environment, the scheduling component configured to: receive, at an execution queue, a job for processing in the distributed processing environment; and an allocation component associated with the scheduling component, the allocation component configured to: determine, at the distributed processing environment, an available state associated with a central processing component of the plurality of central processing components or a parallel processing component of the plurality of parallel processing components; determine, based at least in part on a processing strategy, that the job is associated with the central processing component or the parallel processing component; and adjust, based at least in part on an available state of the central processing component or the parallel processing component and the processing strategy, at least one of: an order of the job within the execution queue; or an amount of the central processing component or the parallel processing component associated with the job.

B: The system of paragraph A, wherein the allocation component associated with the scheduling component is further configured to: determine an availability state of the central processing component; and determine, as an association, that the job is associated with the central processing component; and increase, based at least in part on the association, the order of the job in the execution queue.

C: The system of paragraph A or B, wherein the job is a first job, and wherein the allocation component is further configured to: receive a first submission date associated with the first job; receive a second submission date associated with a second job in the execution queue; determine that the first submission date is newer than the second submission date; and increase, based on the first submission date being newer than the second submission date, a priority of the first job.

D: The system of any of paragraphs A-C, wherein the central processing component is a first central processing component and the available state is a first available state, and wherein the allocation component is further configured to: control the job to be executed at the first central processing component; determine a second available state associated with a second central processing component; and control, based at least in part on the second available state, the job to be executed at the first central processing component and the second central processing component.

E: The system of any of paragraphs A-D, wherein the allocation component is further configured to: determine the job is associated with a remote computing device; and execute the job at the remote computing device.

F: A method comprising: receiving, at a scheduling component of a distributed processing environment, a plurality of jobs; associating, by the scheduling component, the plurality of jobs with an execution queue; determining, by a priority allocation component, an available state associated with a job characteristic; determining, by the priority allocation component, that the job characteristic is associated with a job in the execution queue; and adjusting, based at least in part on the job characteristic being associated with the job, a priority level of the job or an amount of the job characteristic associated with the job.

G: The method of paragraph F, wherein the job characteristic is a first job characteristic, the method further comprising: receiving a second job characteristic; determining, as an association, that the second job characteristic is associated with the job; and increasing, based on the second job characteristic, the priority level of the job.

H: The method of paragraph F or G, wherein the job is a first job, the method further comprising: receiving a first submission date associated with the first job; receiving a second submission date associated with a second job in the execution queue; determining that the first submission date is newer than the second submission date; and increasing, based on the first submission date being newer than the second submission date, a priority of the first job.

I: The method any of paragraphs F-H, wherein the job characteristic is a name of the job, and the job is a first job, the method further comprising: determining, as a determination, that the name of the job is associated with a higher priority level than a second job in the execution queue; and increasing, based on the determination, a priority level of the first job.

J: The method of any of paragraphs F-I, wherein the job characteristic is a first processing component, the method further comprising: executing the job at the first processing component; determining a second available state associated with a second processing component; and executing, based at least in part on the second available state, the job at the first processing component and the second processing component.

K: The method of any of paragraphs FJ, wherein the job characteristic is a first job characteristic, the method further comprising: decreasing a priority level of a second job in the execution queue, wherein the second job is associated with a second job characteristic that is different than the first job characteristic.

L: The method of paragraph K, wherein decreasing the priority level of the second job comprises lowering an order of the second job within the execution queue.

M: The method of any of paragraphs F-L, wherein adjusting the priority level of the job comprises adjusting an order of the job within the execution queue.

N: The method of any of paragraphs F-M, wherein the job characteristic is a first job characteristic, the method further comprising: receiving a second job characteristic, wherein the first job characteristic is associated with a first priority level and the second job characteristic is associated with a second priority level lower than the first priority level; determining that the second job characteristic is associated with the job; and increasing, based at least in part on the second job characteristic, the priority level of the job.

O: The method of any of paragraphs F-N, wherein the job characteristic comprises one or more of: a central processing component; a graphics processing component; a local processing component; a remote processing component; a non-virtualized processing component; a submission date; or a name.

P: One or more non-transitory computer-readable media storing instructions executable by a processor, wherein the instructions, when executed, cause the processor to perform operations comprising: receiving, at a scheduling component of a distributed processing environment, a plurality of jobs; associating, by the scheduling component, the plurality of jobs with an execution queue; determining, by a priority allocation component, an available state associated with a first job characteristic; determining, by the priority allocation component, that the job characteristic is associated with a job in the execution queue; and adjusting, based at least in part on the job characteristic being associated with the job, a priority level of the job or an amount of the job characteristic associated with the job.

Q: The one or more non-transitory computer-readable media of paragraph P, wherein the job characteristic is a first job characteristic, the operations further comprising: receiving a second job component; determining, as an association, that the second job component is associated with the job; and increasing, based on the association, the priority level of the job.

R: The one or more non-transitory computer-readable media of paragraph P or Q, wherein the job is a first job, the operations further comprising: receiving a first submission date associated with the first job; receiving a second submission date associated with a second job in the execution queue; determining that the first submission date is older than the second submission date; and increasing, based on the first submission date being older than the second submission date, a priority level of the first job.

S: The one or more non-transitory computer-readable media of any of paragraphs P-R, the operations further comprising: executing the job at a first processing component; determining a second available state associated with a second processing component; and executing, based at least in part on the second available state, the job at the first processing component and the second processing component.

T: The one or more non-transitory computer-readable media of any of paragraphs P-S, wherein the job component is a first job characteristic, the operations further comprising: receiving a second job component, wherein the first job characteristic is associated with a first priority level and the second job component is associated with a second priority level lower than the first priority level; determining that the second job component is associated with the job; and increasing, based at least in part on the second job component, the priority level of the job.

U: A system comprising: one or more processors; and one or more non-transitory computer-readable media storing computer-executable instructions that, when executed, cause the one or more processor to perform operations comprising: receiving, at an execution queue, a processing job associated with an operation of an autonomous vehicle; determining that a scheduling component associated with a first distributed processing environment is associated with an overload attribute; determining, by a controller, an overload state associated with the overload attribute; generating, based at least in part on the overload state, a second distributed processing environment; and allocating, by the controller, the processing job to the second distributed processing environment.

V: The system of paragraph U, wherein the first distributed processing environment comprises: the scheduling component; and a plurality of computing resources allocated to the first distributed processing environment.

W: The system of paragraph U or V, wherein the overload attribute comprises at least one of: a first number of processing jobs executing at the first distributed processing environment; a second number of processing jobs within the execution queue; a total processing job runtime; an organizational attribution associated with the first distributed processing environment; a processing job response time; a processing job turnaround time; or a wait time associated with the execution queue.

X: The system of any of paragraphs U-W, wherein the first distributed processing environment is configured to operate independently from the second distributed processing environment.

Y: The system of any of paragraphs U-X, the operations further comprising: allocating, by the controller, a second processing job to the first distributed processing environment or the second distributed processing environment based on at least one of: a first load level of the first distributed processing environment and a second load level of the second distributed processing environment; an execution constraint of the second processing job; or a first hardware availability of the first distributed processing environment and a second hardware availability of the second distributed processing environment.

Z: A method comprising: receiving, at an execution queue, a processing job; determining that a scheduling component of a first distributed processing environment is associated with an attribute; determining, by a controller, an unavailable state associated with the attribute; generating, based at least in part on the unavailable state, a second distributed processing environment; and allocating, by the controller, the processing job to the second distributed processing environment.

AA: The method of paragraph Z, wherein the first distributed processing environment comprises: the scheduling component; and a plurality of computing resources allocated to the first distributed processing environment.

AB: The method of paragraph Z or AA, wherein the unavailable state is indicative of an overload state of the scheduling component.

AC: The method of any of paragraphs Z-AB, wherein the attribute comprises at least one of: a first number of processing jobs executing at the first distributed processing environment; a second number of processing jobs within the execution queue; a total processing job runtime; an organizational attribution associated with the first distributed processing environment; a processing job response time; a processing job turnaround time; or a wait time associated with the queue.

AD: The method of any of paragraphs Z-AC, further comprising: transmitting, based at least in part on the unavailability state of a component associated with the attribute at the first distributed processing environment, the component associated with the attribute from the second distributed processing environment to the first distributed processing environment.

AE: The method of any of paragraphs Z-AD, wherein the first distributed processing environment is configured to operate independently of the second distributed processing environment.

AF: The method of any of paragraphs Z-AE, further comprising: receiving, at the execution queue, a second processing job; determining that the second processing job is associated with a local processing component; determining, by the controller, an unavailability state associated with a local processing component of the first distributed processing environment; and receiving, at the queue and by the controller, a third processing job associated with an operation of the vehicle.

AG: The method of any of paragraphs Z-AF, further comprising: allocating, by the controller, a second processing job to the first distributed processing environment or the second distributed processing environment based on at least one of: a first load level of the first distributed processing environment and a second load level of the second distributed processing environment; an execution constraint of the second processing job; or a first hardware availability of the first distributed processing environment and a second hardware availability of the second distributed processing environment.

AH: The method of any of paragraphs Z-AG, further comprising: receiving an estimated completion time for the job; determining, by the controller, that an actual completion time for the job is longer than the estimated completion time for the job; and generating, by the controller, a third distributed processing environment.

AI: The method of any of paragraphs Z-AH, further comprising: receiving a threshold associated with a maximum amount of jobs executable at the second distributed processing environment; determining, by the controller, that an amount of jobs to be executed at the second distributed processing environment meets or exceeds the threshold; and generating, by the controller, a third distributed processing environment.

AJ: One or more non-transitory computer-readable media storing instructions executable by a processor, wherein the instructions, when executed, cause the processor to perform operations comprising: receiving, at an execution queue, a processing job; determining that a scheduler component of the first distributed processing environment is associated with an attribute; determining, by a controller, an unavailable state associated with the attribute; generating, based at least in part on the unavailable state, a second distributed processing environment; and allocating, by the controller, the processing job to the second distributed processing environment.

AK: The one or more non-transitory computer-readable media of paragraph AJ, wherein the first distributed processing environment comprises: the scheduling component; and a plurality of computing resources allocated to the first distributed processing environment.

AL: The one or more non-transitory computer-readable media of paragraph AJ or AK, wherein the unavailable state is indicative of an overload state of the scheduling component.

AM: The one or more non-transitory computer-readable media of any of paragraphs AJ-AL, wherein the attribute comprises at least one of: a first number of processing jobs executing at the first distributed processing environment; a second number of processing jobs within the execution queue; a total processing job runtime; an organizational attribution associated with the first distributed processing environment; a processing job response time; a processing job turnaround time; or a wait time associated with the execution queue.

AN: The one or more non-transitory computer-readable media of any of paragraphs AJ-AM, the operations further comprising: transmitting, by the controller, a second processing job to the first distributed processing environment or the second distributed processing environment based on at least one of: a first load level of the first distributed processing environment and a second load level of the second distributed processing environment; an execution constraint of the second processing job; or a first hardware availability of the first distributed processing environment and a second hardware availability of the second distributed processing environment.

AO: A system comprising: one or more processors; and one or more non-transitory computer-readable media storing computer-executable instructions that, when executed, cause the one or more processor to perform operations comprising: receiving, at a controller associated with a distributed processing environment, a data pipeline, wherein the data pipeline includes a plurality of jobs; receiving, at an error recovery component, a retry budget associated with the data pipeline; associating a job of the plurality of jobs with a level of the data pipeline; executing the job at a stage at the level of the data pipeline; receiving, at a scheduling component, an error state associated with the stage; determining, at the error recovery component, that the error state is associated with an undefined error; determining, at the error recovery component, that at least one of the error state is a first error state associated with the level of the data pipeline or that a job was previously executed at the stage; decrementing, by the error recovery component and based at least in part on determining that at least one of the error state is the first error state or that the job was previously executed at the stage, the retry budget; and re-executing the job at the stage.

AP: The system of paragraph AO, wherein the stage is a first stage, the operations further comprising: receiving an aggregate retry budget associated with the level; executing the job at a second stage at the level of the data pipeline, wherein the second stage is different from the first stage; receiving a second error state associated with the second stage; determining that an amount of re-execution associated with the second stage is less than or equal to the aggregate retry budget; and re-executing the job at the second stage without decrementing the retry budget.

AQ: The system of paragraph AO or AP, wherein the level is a first level, the operations further comprising: executing the job at a third stage at a second level of the data pipeline, wherein the second level is different from the first level; receiving an aggregate budget associated with the second level of the data pipeline receiving a third error state associated with the third stage; determining at least one of: that the third error state is a first error state associated with the second level of the data pipeline; or that an amount of re-execution associated with the third stage of the data pipeline exceeds the aggregate budget; decrementing, based at least in part on at least one of the third error state being the first error state associated with the second level of the data pipeline or the amount of re-execution associated with the third stage of the data pipeline exceeds the aggregate budget, the retry budget; and re-executing the job at the third stage.

AR: The system of any of paragraphs AO-AQ, wherein the retry budget is a first retry budget, the operations further comprising: receiving a second retry budget associated with a predefined error; receiving a second error state associated with the stage; determining, as a determination, that the second error state is associated with the predefined error; decrementing, based at least in part on the determination, the second retry budget; and re-executing the job at the stage.

AS: The system of any of paragraphs AO-AR, the operations further comprising: determining a time associated with the error state; determining that a container associated with the job is still active; determining, based at least in part on the time, that a time period has lapsed; and causing, based at least in part on the error state and the time period lapsing, the job to exit the stage.

AT: A method comprising: receiving a data pipeline including a plurality of jobs; associating a job of the plurality of jobs with a level of the data pipeline; receiving a retry budget associated with the data pipeline; executing the job at a stage and at a computing component in a distributed processing environment; receiving, from a scheduling component, an error state associated with the job; determining a classification associated with the error state; updating the retry budget based at least in part on the classification associated with the error state and the level of the data pipeline; and performing additional processing based at least in part on the retry budget, wherein the additional processing includes one of: re-executing the job at the computing component; re-execute the job at a different computing component; or exiting the job in an uncompleted state.

AU: The method of paragraph AT, wherein the stage is a first stage, the method further comprising: executing the job at a second stage at the level of the data pipeline, wherein the second stage is different from the first stage; receiving a second error state associated with the second stage; receiving an aggregate retry budget associated with the level of the data pipeline; determining, as a determination, that an amount of re-execution associated with the second stage is less than or equal to the aggregate retry budget; and re-executing, based at least in part on the determination, the job at the second stage without updating the retry budget.

AV: The method of paragraph AT or AU, wherein the level is a first level, the method further comprising: executing the job at a third stage at a second level of the data pipeline, wherein the second level is different from the first level; receiving an aggregate budget associated with the second level of the data pipeline receiving a third error state associated with the third stage; determining at least one of: that the third error state is a first error state associated with the second level of the data pipeline; or that an amount of re-execution associated with the third stage of the data pipeline exceeds the aggregate budget; updating, based at least in part on at least one of the third error state being the first error state associated with the second level of the data pipeline or the amount of re-execution associated with the third stage of the data pipeline exceeds the aggregate budget, the retry budget; and re-executing the job at the third stage.

AW: The method of any of paragraphs AT-AV, wherein the retry budget is a first retry budget, the method further comprising: receiving a second retry budget associated with a predefined error receiving a second error state associated with the stage; determining that the second error state is associated with the predefined error; updating, based on at least in part on the second error state being associated with the predefined error, the second retry budget; and re-executing the job at the stage.

AX: The method of paragraph AW, wherein the first retry budget is associated with an error associated with the distributed processing environment associated and the error state is a first error state, the method further comprising: determining that the first error state is associated with the distributed processing environment; decrementing, based on determining that the first error state is associated with the distributed processing environment, the first; and re-executing the job at the stage.

AY: The method of any of paragraphs AT-AX, further comprising: determining a time associated with the error state; determining that a container associated with the job is still active; determining, based at least in part on the time, that a time period has lapsed; and causing, based at least in part on the error state and the time period lapsing, the job to exit the stage.

AZ: The method of any of paragraphs AT-AY, wherein receiving the retry budget further comprises determining the retry budget based on at least one of a user profile or a job type.

BA: The method of any of paragraphs AT-AZ, wherein the classification associated with the error state comprises at least one of: an error associated with the distributed processing environment; a user error; or an undefined error.

BB: The method of any of paragraphs AT-BA, wherein re-executing the job at the different computing component comprises: transmitting the job to a job queue associated with the distributed processing environment; and executing the job at the distributed processing environment.

BC: The method of any of paragraphs AT-BB, wherein determining the classification of the error state further comprises: receiving an error code; transmitting an error state to a log file; and determining, using a controller and from the error code or the log file, a classification of the error state.

BD: One or more non-transitory computer-readable media storing instructions executable by a processor, wherein the instructions, when executed, cause the processor to perform operations comprising: receiving a data pipeline including a plurality of jobs; associating a job of the plurality of jobs with a level of the data pipeline; receiving a retry budget associated with the data pipeline; executing the job at a stage and at a computing component in a distributed processing environment; receiving, from a scheduling component, an error state associated with the job; determining a classification associated with the error state; updating the retry budget based at least in part on the classification associated with the error state and the level of the data pipeline; and performing additional processing based at least in part on the retry budget, wherein the additional processing includes one of: re-executing the job at the computing component; re-execute the job at a different computing component; or exiting the job in an uncompleted state.

BE: The one or more non-transitory computer-readable media of paragraph BD, wherein the stage is a first stage, the operations further comprising: executing the job at a second stage at the level of the data pipeline, wherein the second stage is different from the first stage; receiving a second error state associated with the second stage; receiving an aggregate retry budget associated with the level of the data pipeline; determining, as a determination, that an amount of re-execution associated with the second stage is less than or equal to the aggregate retry budget; and re-executing, based at least in part on the determination, the job at the second stage without updating the retry budget.

BF: The one or more non-transitory computer-readable media of paragraph BD or BE, wherein the level is a first level, the operations further comprising: executing the job at a third stage at a second level of the data pipeline, wherein the second level is different from the first level; receiving an aggregate budget associated with the second level of the data pipeline receiving a third error state associated with the third stage; determining at least one of: that the third error state is a first error state associated with the second level of the data pipeline; or that an amount of re-execution associated with the third stage of the data pipeline exceeds the aggregate budget; updating, based at least in part on at least one of the third error state being the first error state associated with the second level of the data pipeline or the amount of re-execution associated with the third stage of the data pipeline exceeds the aggregate budget, the retry budget; and re-executing the job at the third stage.

BG: The one or more non-transitory computer-readable media of any of paragraphs BD-BF, wherein the retry budget is a first retry budget, the operations further comprising: receiving a second retry budget associated with a predefined error receiving a second error state associated with the stage; determining that the second error state is associated with the predefined error; updating, based on at least in part on the second error state being associated with the predefined error, the second retry budget; and re-executing the job at the stage.

BH: The one or more non-transitory computer-readable media of any of paragraphs BD-BG, the operations further comprising: determining a time associated with the error state; determining that a container associated with the job is still active; determining, based at least in part on the time, that a time period has lapsed; and causing, based at least in part on the error state and the time period lapsing, the job to exit the stage.

While the example clauses described above are described with respect to one particular implementation, it should be understood that, in the context of this document, the content of the example clauses can also be implemented via a method, device, system, computer-readable medium, and/or another implementation. Additionally, any of examples A-BH may be implemented alone or in combination with any other one or more of the examples A-BH.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more non-transitory computer-readable media storing computer-executable instructions that, when executed, cause the one or more processors to perform operations comprising:
receiving, at a controller associated with a distributed processing environment, a data pipeline, wherein the data pipeline includes a plurality of jobs;
receiving, at an error recovery component, a retry budget associated with the data pipeline;
associating a job of the plurality of jobs with a level of the data pipeline;
executing the job at a stage at the level of the data pipeline;
receiving, at a scheduling component, an error state associated with the stage;
determining, at the error recovery component, that the error state is associated with an undefined error;
determining, at the error recovery component, that at least one of the error state is a first error state associated with the level of the data pipeline or that a job was previously executed at the stage;
decrementing, by the error recovery component and based at least in part on determining that at least one of the error state is the first error state or that the job was previously executed at the stage, the retry budget; and
re-executing the job at the stage.

2. The system of claim 1, wherein the stage is a first stage, the operations further comprising:
receiving an aggregate retry budget associated with the level;
executing the job at a second stage at the level of the data pipeline, wherein the second stage is different from the first stage;
receiving a second error state associated with the second stage;
determining that an amount of re-execution associated with the second stage is less than or equal to the aggregate retry budget; and
re-executing the job at the second stage without decrementing the retry budget.

3. The system of claim 1, wherein the level is a first level, the operations further comprising:
executing the job at a third stage at a second level of the data pipeline, wherein the second level is different from the first level;
receiving an aggregate budget associated with the second level of the data pipeline
receiving a third error state associated with the third stage;
determining at least one of:
that the third error state is a first error state associated with the second level of the data pipeline; or
that an amount of re-execution associated with the third stage of the data pipeline exceeds the aggregate budget;
decrementing, based at least in part on at least one of the third error state being the first error state associated with the second level of the data pipeline or the amount of re-execution associated with the third stage of the data pipeline exceeds the aggregate budget, the retry budget; and
re-executing the job at the third stage.

4. The system of claim 1, wherein the retry budget is a first retry budget, the operations further comprising:
receiving a second retry budget associated with a predefined error;
receiving a second error state associated with the stage;
determining, as a determination, that the second error state is associated with the predefined error;
decrementing, based at least in part on the determination, the second retry budget; and
re-executing the job at the stage.

5. The system of claim 1, the operations further comprising:
    determining a time associated with the error state;
    determining that a container associated with the job is still active;
    determining, based at least in part on the time, that a time period has lapsed; and
    causing, based at least in part on the error state and the time period lapsing, the job to exit the stage.

6. A method comprising:
    receiving a data pipeline including a plurality of jobs;
    associating a job of the plurality of jobs with a level of the data pipeline;
    receiving a retry budget associated with the data pipeline;
    executing the job at a stage and at a computing component in a distributed processing environment;
    receiving, from a scheduling component, an error state associated with the job;
    determining a classification associated with the error state;
    updating the retry budget based at least in part on the classification associated with the error state and the level of the data pipeline; and
    performing additional processing based at least in part on the retry budget, wherein the additional processing includes one of:
        re-executing the job at the computing component;
        re-execute the job at a different computing component; or
        exiting the job in an uncompleted state.

7. The method of claim 6, wherein the stage is a first stage, the method further comprising:
    executing the job at a second stage at the level of the data pipeline, wherein the second stage is different from the first stage;
    receiving a second error state associated with the second stage;
    receiving an aggregate retry budget associated with the level of the data pipeline;
    determining, as a determination, that an amount of re-execution associated with the second stage is less than or equal to the aggregate retry budget; and
    re-executing, based at least in part on the determination, the job at the second stage without updating the retry budget.

8. The method of claim 6, wherein the level is a first level, the method further comprising:
    executing the job at a third stage at a second level of the data pipeline, wherein the second level is different from the first level;
    receiving an aggregate budget associated with the second level of the data pipeline
    receiving a third error state associated with the third stage;
    determining at least one of:
        that the third error state is a first error state associated with the second level of the data pipeline; or
        that an amount of re-execution associated with the third stage of the data pipeline exceeds the aggregate budget;
    updating, based at least in part on at least one of the third error state being the first error state associated with the second level of the data pipeline or the amount of re-execution associated with the third stage of the data pipeline exceeds the aggregate budget, the retry budget; and
    re-executing the job at the third stage.

9. The method of claim 6, wherein the retry budget is a first retry budget, the method further comprising:
    receiving a second retry budget associated with a predefined error
    receiving a second error state associated with the stage;
    determining that the second error state is associated with the predefined error;
    updating, based on at least in part on the second error state being associated with the predefined error, the second retry budget; and
    re-executing the job at the stage.

10. The method of claim 9, wherein the first retry budget is associated with an error associated with the distributed processing environment associated and the error state is a first error state, the method further comprising:
    determining that the first error state is associated with the distributed processing environment;
    decrementing, based on determining that the first error state is associated with the distributed processing environment, the first; and
    re-executing the job at the stage.

11. The method of claim 6, further comprising:
    determining a time associated with the error state;
    determining that a container associated with the job is still active;
    determining, based at least in part on the time, that a time period has lapsed; and
    causing, based at least in part on the error state and the time period lapsing, the job to exit the stage.

12. The method of claim 6, wherein receiving the retry budget further comprises determining the retry budget based on at least one of a user profile or a job type.

13. The method of claim 6, wherein the classification associated with the error state comprises at least one of:
    an error associated with the distributed processing environment;
    a user error; or
    an undefined error.

14. The method of claim 6, wherein re-executing the job at the different computing component comprises:
    transmitting the job to a job queue associated with the distributed processing environment; and
    executing the job at the distributed processing environment.

15. The method of claim 6, wherein determining the classification of the error state further comprises:
    receiving an error code;
    transmitting an error state to a log file; and
    determining, using a controller and from the error code or the log file, a classification of the error state.

16. One or more non-transitory computer-readable media storing instructions executable by a processor, wherein the instructions, when executed, cause the processor to perform operations comprising:
    receiving a data pipeline including a plurality of jobs;
    associating a job of the plurality of jobs with a level of the data pipeline;
    receiving a retry budget associated with the data pipeline;
    executing the job at a stage and at a computing component in a distributed processing environment;
    receiving, from a scheduling component, an error state associated with the job;
    determining a classification associated with the error state;
    updating the retry budget based at least in part on the classification associated with the error state and the level of the data pipeline; and performing additional processing based at least in part on the retry budget, wherein the additional processing includes one of:
- re-executing the job at the computing component;
- re-execute the job at a different computing component; or
- exiting the job in an uncompleted state.

17. The one or more non-transitory computer-readable media of claim 16, wherein the stage is a first stage, the operations further comprising:
- executing the job at a second stage at the level of the data pipeline, wherein the second stage is different from the first stage;
- receiving a second error state associated with the second stage;
- receiving an aggregate retry budget associated with the level of the data pipeline;
- determining, as a determination, that an amount of re-execution associated with the second stage is less than or equal to the aggregate retry budget; and
- re-executing, based at least in part on the determination, the job at the second stage without updating the retry budget.

18. The one or more non-transitory computer-readable media of claim 16, wherein the level is a first level, the operations further comprising:
- executing the job at a third stage at a second level of the data pipeline, wherein the second level is different from the first level;
- receiving an aggregate budget associated with the second level of the data pipeline
- receiving a third error state associated with the third stage;
- determining at least one of:
  - that the third error state is a first error state associated with the second level of the data pipeline; or
  - that an amount of re-execution associated with the third stage of the data pipeline exceeds the aggregate budget;
- updating, based at least in part on at least one of the third error state being the first error state associated with the second level of the data pipeline or the amount of re-execution associated with the third stage of the data pipeline exceeds the aggregate budget, the retry budget; and
- re-executing the job at the third stage.

19. The one or more non-transitory computer-readable media of claim 16, wherein the retry budget is a first retry budget, the operations further comprising:
- receiving a second retry budget associated with a pre-defined error
- receiving a second error state associated with the stage;
- determining that the second error state is associated with the predefined error;
- updating, based on at least in part on the second error state being associated with the predefined error, the second retry budget; and
- re-executing the job at the stage.

20. The one or more non-transitory computer-readable media of claim 16, the operations further comprising:
- determining a time associated with the error state;
- determining that a container associated with the job is still active;
- determining, based at least in part on the time, that a time period has lapsed; and
- causing, based at least in part on the error state and the time period lapsing, the job to exit the stage.

* * * * *